(12) United States Patent
Kuznetsov

(10) Patent No.: US 11,183,846 B2
(45) Date of Patent: Nov. 23, 2021

(54) SYSTEM AND METHOD FOR MODULATING HIGH POWER IN A SUBMERSIBLE ENERGY STORAGE VESSEL UTILIZING HIGH VOLTAGE DC TRANSMISSION

(71) Applicant: Raytheon Company, Waltham, MA (US)

(72) Inventor: Stephen Kuznetsov, Marlborough, MA (US)

(73) Assignee: Raytheon Company, Waltham, MA (US)

( * ) Notice: Subject to any disclaimer, the term of this patent is extended or adjusted under 35 U.S.C. 154(b) by 229 days.

(21) Appl. No.: 15/853,086

(22) Filed: Dec. 22, 2017

(65) Prior Publication Data
US 2019/0199094 A1    Jun. 27, 2019

(51) Int. Cl.
| | |
|---|---|
| *H02J 3/30* | (2006.01) |
| *H02J 3/10* | (2006.01) |
| *H02J 1/16* | (2006.01) |
| *H02J 3/32* | (2006.01) |
| *H02P 6/00* | (2016.01) |
| *H02P 9/00* | (2006.01) |
| *H02P 9/48* | (2006.01) |

(Continued)

(52) U.S. Cl.
CPC .................. *H02J 3/30* (2013.01); *H02J 1/10* (2013.01); *H02J 1/16* (2013.01); *H02J 3/10* (2013.01); *H02J 3/28* (2013.01); *H02J 3/32* (2013.01); *H02J 7/0068* (2013.01); *H02J 7/34* (2013.01); *H02J 15/00* (2013.01); *H02P 6/005* (2013.01); *H02P 9/007* (2013.01); *H02P 9/48* (2013.01); *H02J 5/00* (2013.01)

(58) Field of Classification Search
CPC .................. H02J 3/30; H02J 3/00; H02J 3/10
USPC ...................................... 307/64–68
See application file for complete search history.

(56) References Cited

U.S. PATENT DOCUMENTS

| | | | | |
|---|---|---|---|---|
| 2,664,534 A | * | 12/1953 | Noodleman | ............ H02P 25/20 318/814 |
| 4,187,457 A | * | 2/1980 | Wanlass | ................ H02K 17/08 318/729 |

(Continued)

FOREIGN PATENT DOCUMENTS

WO    WO-9403970 A1 *  2/1994  ................ H02P 9/48

OTHER PUBLICATIONS

International Search Report and Written Opinion of the International Searching Authority for International Patent Application No. PCT/US2018/063209 dated Feb. 14, 2019, 15 pages.

*Primary Examiner* — Adi Amrany

(57) ABSTRACT

A system includes multiple hybrid energy storage modules (HESMs) configured to accept constant-current DC input power from a main power source. Each HESM has a plurality of outputs configured to sequentially or simultaneously provide both constant-current and constant-voltage output power to multiple loads, the loads comprising steady state, pulsating, or intermittent loads. Each HESM comprises a combined rotating electrical machine-inertial storage module and electro-chemical storage module configured to generate second power that augments or induces first power derived from the main power source, so as to permit constant power draw or constant current draw from the main power source, wherein the output power comprises the first power and the second power.

20 Claims, 19 Drawing Sheets

(51) Int. Cl.
*H02J 7/00* (2006.01)
*H02J 7/34* (2006.01)
*H02J 3/28* (2006.01)
*H02J 1/10* (2006.01)
*H02J 15/00* (2006.01)
*H02J 5/00* (2016.01)

(56) References Cited

U.S. PATENT DOCUMENTS

| | | | |
|---|---|---|---|
| 6,118,678 A | 9/2000 | Limpaecher et al. | |
| 6,819,012 B1* | 11/2004 | Gabrys | H02J 9/066 307/68 |
| 9,373,963 B2 | 6/2016 | Kuznetsov | |
| 9,531,247 B2 | 12/2016 | Kuznetsov | |
| 9,531,289 B2 | 12/2016 | Kuznetsov | |
| 9,667,232 B2 | 5/2017 | Kuznetsov | |
| 2002/0101119 A1* | 8/2002 | Eisenhaure | H02J 9/08 307/64 |
| 2006/0066104 A1* | 3/2006 | Melfi | H02J 9/066 290/1 A |
| 2010/0094490 A1 | 4/2010 | Alston et al. | |
| 2010/0308765 A1* | 12/2010 | Moore | H02J 7/0013 320/103 |
| 2012/0025535 A1* | 2/2012 | Sihler | H02J 1/04 290/55 |
| 2012/0161518 A1* | 6/2012 | Schroeder | H02J 3/36 307/36 |
| 2013/0026831 A1* | 1/2013 | Sihler | H02M 7/5387 307/19 |
| 2013/0258733 A1* | 10/2013 | Zhang | H02M 7/493 363/127 |
| 2013/0285491 A1* | 10/2013 | Kuznetsov | H02M 5/271 310/71 |
| 2014/0042975 A1* | 2/2014 | Miller | H02J 7/00 320/127 |
| 2014/0131049 A1* | 5/2014 | Bourgeau | E21B 33/0355 166/363 |
| 2014/0346868 A1* | 11/2014 | Kuznetsov | H02J 4/00 307/18 |
| 2015/0340860 A1 | 11/2015 | Tenca | |
| 2016/0013641 A1* | 1/2016 | Sun | H02J 3/381 307/24 |
| 2016/0197600 A1* | 7/2016 | Kuznetsov | H02J 1/16 307/106 |
| 2016/0336928 A1 | 11/2016 | Kuznetsov | |
| 2017/0149345 A1* | 5/2017 | Boe | H01G 4/38 |
| 2017/0357281 A1* | 12/2017 | Langelier | G05F 1/66 |
| 2018/0247753 A1* | 8/2018 | Stromsvik | H01F 27/02 |
| 2020/0132049 A1* | 4/2020 | Feltes | F03D 9/255 |
| 2020/0373785 A1* | 11/2020 | Bagchi | B60L 53/30 |

* cited by examiner

SYSTEM AND METHOD FOR MODULATING HIGH POWER IN A SUBMERSIBLE ENERGY STORAGE VESSEL UTILIZING HIGH VOLTAGE DC TRANSMISSION

TECHNICAL FIELD

This disclosure is directed in general to control of power systems. More specifically, this disclosure relates to a system and method for modulating high power in a submersible energy storage vessel utilizing high voltage DC transmission.

BACKGROUND

Typical energy storage modules (ESM) are focused on land or surface ship applications where the energy source is relatively close (e.g., 100 meters or less) to the intended location for the ESM and the load is similarly in close proximity to the ESM. Electrical parameters for the ESM or hybrid energy storage module (HESM) are specific to the short transmission distances, and typically these systems operate as constant-voltage AC or DC with optional constant-voltage or constant-current output. The short transmission line distances permit low system electrical reactances, which generally enhance fast speeds of response. However, such ESM schemes have limited ability to operate efficiently when fed by an energy source which is located hundreds or thousands of meters from the energy source or subsystem. Also, such systems are generally heavy and occupy a large volumetric space, which is not conducive to transporting to or installing in submersible stations.

SUMMARY

This disclosure provides a system and method for modulating high power in a submersible energy storage vessel utilizing high voltage DC transmission.

In a first embodiment, a system includes multiple hybrid energy storage modules (HESMs) configured to accept constant-current DC input power from a main power source. Each HESM has a plurality of outputs configured to sequentially or simultaneously provide both constant-current and constant-voltage output power to multiple loads, the loads comprising steady state, pulsating, or intermittent loads. Each HESM comprises a combined rotating electrical machine-inertial storage module and electro-chemical storage module configured to generate second power that augments or induces first power derived from the main power source, so as to permit constant power draw or constant current draw from the main power source, wherein the output power comprises the first power and the second power.

In a second embodiment, a system includes a main power source. The system also includes multiple HESMs configured to accept constant-current electrical input power from the main power source. The system also includes a power transmission line configured to connect the multiple HESMs in series and provide the input power from the main power source to each HESM. Each HESM has a plurality of outputs configured to sequentially or simultaneously provide both constant-current and constant-voltage output power to multiple loads, the loads comprising steady state, pulsating, or intermittent loads. Each HESM comprises a combined rotating electrical machine-inertial storage module and electro-chemical storage module configured to generate second power that augments first power derived from the main power source, so as to permit constant power draw or constant current draw from the main power source, wherein the output power comprises the first power and the second power, which respectively act as a primary energy source and as a primary excitation source.

In a third embodiment, a system includes an onshore main power source. The system also includes multiple HESMs configured to accept constant-current DC or AC input power from the main power source, each HESM disposed in a subsea location. The system also includes a DC or low frequency AC transmission line configured to connect the multiple HESMs in series and provide the input power from the main power source to each HESM. Each HESM has a plurality of outputs configured to sequentially or simultaneously provide both constant-current and constant-voltage DC or AC output power to multiple loads, the loads comprising steady state, pulsating, or intermittent loads. Each HESM comprises a combined rotating electrical machine-inertial storage module and electro-chemical storage module configured to generate second excitation power that augments or induces first power derived from the main power source, so as to permit constant power draw or constant current draw from the main power source, wherein the output power feeds at least one of the multiple loads.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
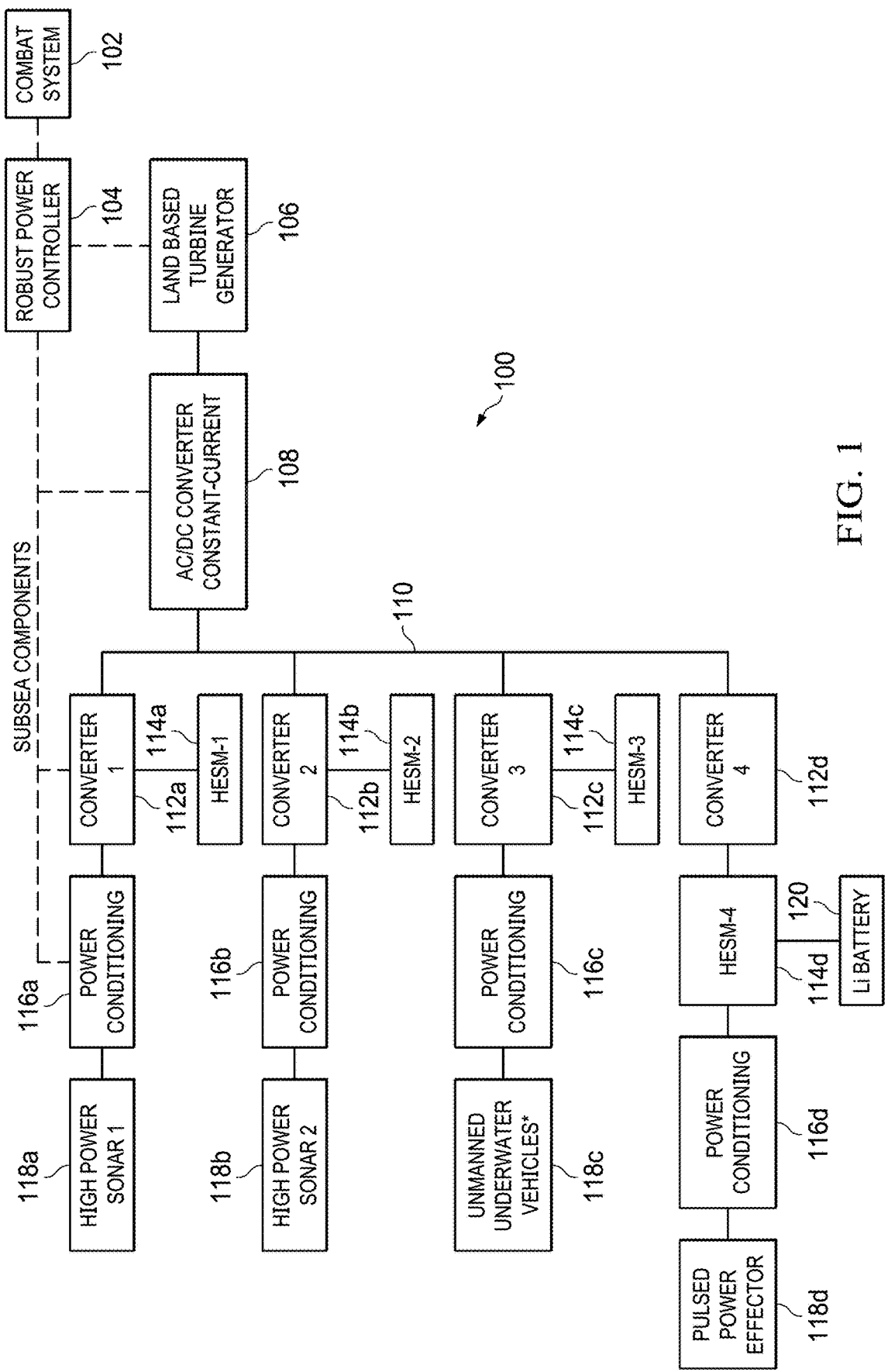
FIG. 1 illustrates a high-level architecture of an example submersible pulsed energy storage system with a high voltage DC (HVDC) power conversion apparatus according to this disclosure.

FIGS. 1 through 16, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity and is not meant to imply that the feature or component cannot be employed in the embodiments described in connection with that figure.

Embodiments of this disclosure provide a system and method for high power submersible sonar arrays or large electromagnetic (EM) effector stations, which allow the energy source (e.g., a turbine generator, solar generator, wind generator, etc.) to be located a far distance from the energy storage device (ESD). In addition, the ESD may be located a far distance from the final load, while still providing high efficiency. The ESD may be a single-stage energy storage module or a hybrid storage module comprising two substantially different types of energy storage elements (e.g., an ultra-capacitor in combination with a rotating machine-flywheel set), each with different time constants and/or electrical impedances.

A key aspect of the disclosed embodiments is that the link between the energy source and the ESD includes a constant-current (CC) loop rather than a constant-voltage line, which is advantageous for transmission of large blocks of electrical energy over distances of hundreds or thousands of meters in an environment such as undersea ocean. In some embodiments, the system has multiple ESD stations fed by a high voltage DC constant-current loop, where all ESD stations are in series for their input power, and have either constant-voltage DC or constant-current DC output to suit a variety of different loads including pulsed power loads.

The disclosed embodiments support loads that are pulsed power, stochastic power, steady state power, or a combination of the three, such as Sonar and autonomous underwater vehicles (AUV). One purpose of the ESD is to accommodate large recurrent pulsed power loads, such as an electromagnetic effector, but to limit the instantaneous power draw from the source power and to buffer the source, so as not to physically damage the power generator or its transmission line from overload currents or its heating effects. Another technical advantage of the disclosed embodiments is the ability to limit the transient recovery voltage (TRV) that appears on a transmission system, which otherwise could have a damaging effect on cables or source apparatuses.

A further technical advantage of the disclosed embodiments is the transformation of system impedances. The transmission line from the source to the ESD has a relatively high impedance, whereas the ESD output and its typically shorter transmission line operate at a lower impedance, hence a higher current level consistent with load requirements. Also disclosed is a power conditioning apparatus that produces the impedance transformation in an efficient and compact nature.

The disclosed embodiments also advantageously encompass a change in electrical time constant from input line to output line. For example, in some embodiments, the high voltage DC input constant-current line has a longer time constant than the output constant-current time constant or output constant-voltage time constant by at least a factor of two. The shorter time constant of the output circuit or loop facilitates rapid delivery of pulsed power to an electromagnetic effector sub-system, such as a pulse forming network (PFN) or a pulse shaping network (PSN) as described herein. Aspects of the disclosed embodiments allow for a 10:1 change in time constant from input to output line. It is noted that there is also typically a corresponding change in voltage level.

It will be understood that embodiments of this disclosure may include any one, more than one, or all of the features described here. Also, embodiments of this disclosure may additionally or alternatively include other features not listed here. For example, the disclosed embodiments may include one or more features described in U.S. Pat. Nos. 9,531,247; 9,531,289; 9,373,963; and 9,667,232, the contents of which are incorporated herein by reference. While the disclosed embodiments may be described with respect to power systems in certain applications, these embodiments are also applicable in any other suitable systems or applications.

FIG. 1 illustrates a high-level architecture of an example submersible pulsed energy storage system 100 with a high voltage DC (HVDC) power conversion apparatus according to this disclosure. As shown in FIG. 1, the system 100 includes land-based components, including a combat system 102, a power controller 104, a turbine driven power generator 106, and an AC/DC converter 108. The system 100 also includes subsea components, including power converters 112a-112d, hybrid energy storage modules (HESMs) 114a-114d, power conditioning blocks 116a-116d, loads 118a-118d, and a battery 120. The subsea components may be located up to 10 km below the water surface and approximately 50 km from the shore. A high voltage DC transmission line 110 connects the subsea components to the land based components. In some embodiments, the transmission line 110 can be 10-100 km long or longer.

The generator 106 and AC/DC converter 108 provide a constant-current source of power to the transmission line 110. In some embodiments, the generator 106 is configured to provide approximately 20 kV of constant-current power. However, the power converters 112a-112d and HESMs 114a-114d allow an input of either constant power or constant current to the loads 118a-118d.

In some embodiments, the HESMs 114a-114c are shunt connected storage sub-systems to a three-port DC/AC converter without galvanic isolation. In contrast, the HESM 114d can preferably be a series-connected storage sub-system to a simpler two-port converter 112d with galvanic isolation, with the HESM 114d feeding the pulsed power effector.

Although not explicitly shown in FIG. 1 (but more clearly shown in later figures, such as FIGS. 2 and 4), the inputs to the different power converters 112a-112d are linked in series in one loop using the transmission line 110.

The system 100 is capable of providing different power levels to different types of loads 118a-118d, including high power Sonar 118a-118b (e.g., a pulsed load), charging of unmanned underwater vehicles (UUVs) 118c (such as surveillance UUVs), and kinetic energy weapon (KEW) electromagnetic (EM) effectors 118d (such as induction launchers). Each load 118a-118d is coupled to a corresponding power converter 112a-112d and HESM 114a-114d. In particular, the system 100 is capable of transmitting 10 megawatts (MW) or more over a distance of 100 km or more. Peak energy range can be 3-150 MJ, although lesser or greater amounts are also possible. Voltage range of the system 100 can be, e.g., 800-20,00 VDC, although lesser or greater amounts are also possible. Possible slew rates are on the order of a few MW/s.

One advantage of the system 100 is that the undersea portion can keep operating for a while using its energy storage, even if the transmission line 110 to the generator 106 is severed. Further details and advantages of the system 100 are evident in view of the embodiments described below.

Figure 2:
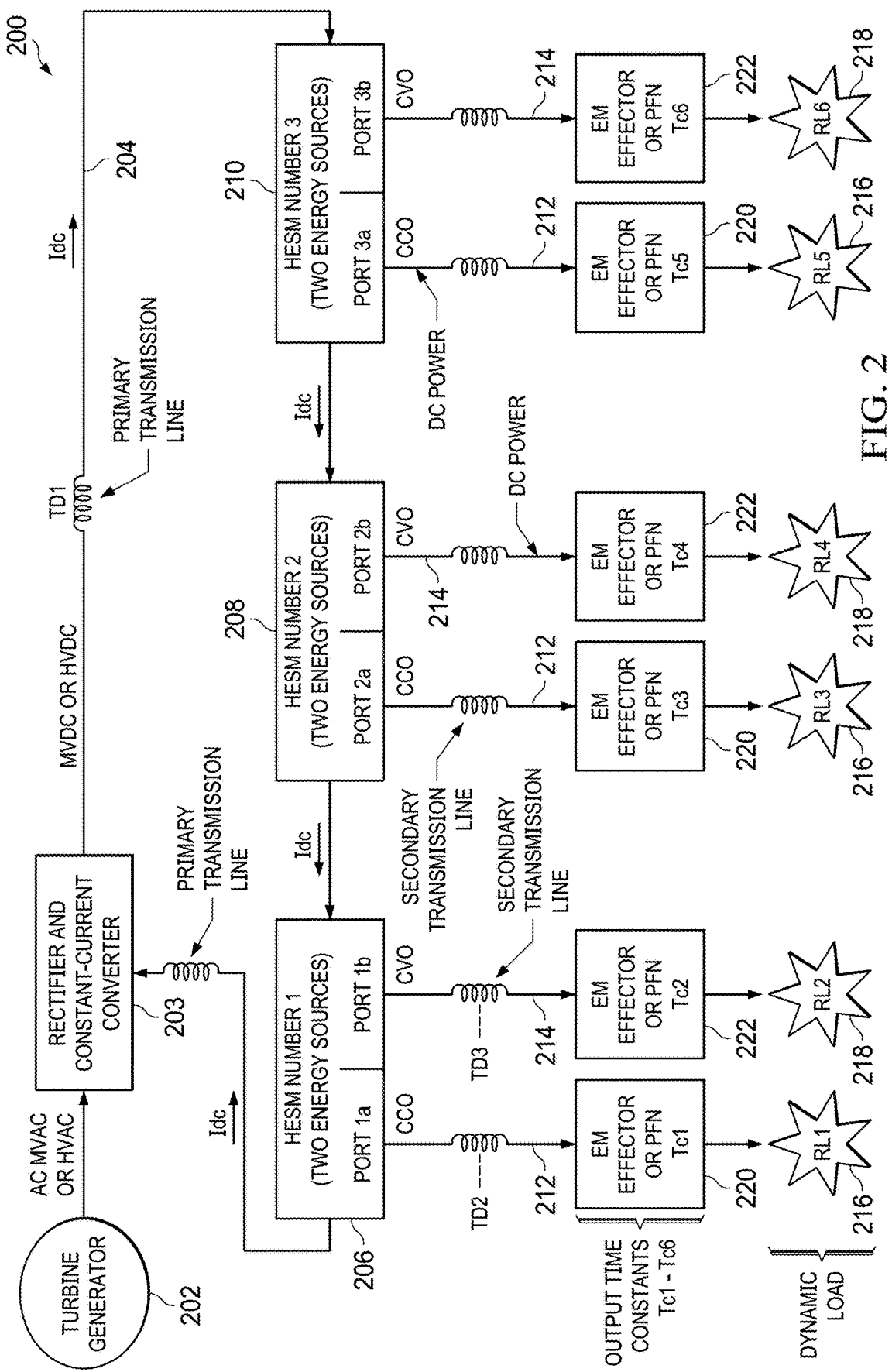
FIG. 2 illustrates a high-level architecture of another submersible pulsed energy storage system with a HVDC power conversion apparatus according to this disclosure.

FIG. 2 illustrates another high-level configuration of a submersible pulsed energy storage system 200 with a HVDC power conversion apparatus according to this disclosure. As shown in FIG. 2, input power from a turbine generator set 202 is converted by a converter 203 to medium-voltage or high-voltage constant-current DC power and transmitted over a long distance transmission line 204 to multiple HESMs 206-210. Each HESM 206-210 has at least two output lines 212-214. The output line 212 is a constant-current output (CCO), and the output line 214 is a constant-voltage output (CVO). Each output line 212-214 feeds separate EM effectors or PFNs 220-222, which in turn feed EM sensors or EM effector loads 216-218, over different transmission distances TD2 and TD3 respectively, which may be on the order of hundreds or thousands of meters. The main loop current $I_{dc}$, is common to all HESMs 206-210 at their input.

In some embodiments, the CCO ports (1a, 2a, 3a, etc.) of each HESM 206-210 are fed by the output of a rotating AC electrical machine-flywheel set ESD 300 (shown in FIG. 3), which yields constant-current output due to a combination of overall machine design and an excitation system for the machine as described in U.S. Pat. No. 9,531,247. The CVO ports (1b, 2b, 3b, etc.) are derived from the ancillary energy storage subsystem, which takes the form of either a high density battery or an ultra-capacitor feeding the load 218 of electrical time constant Tc2. The constant-current output feeds the load 216 and has time constant Tc1.

Figure 3:
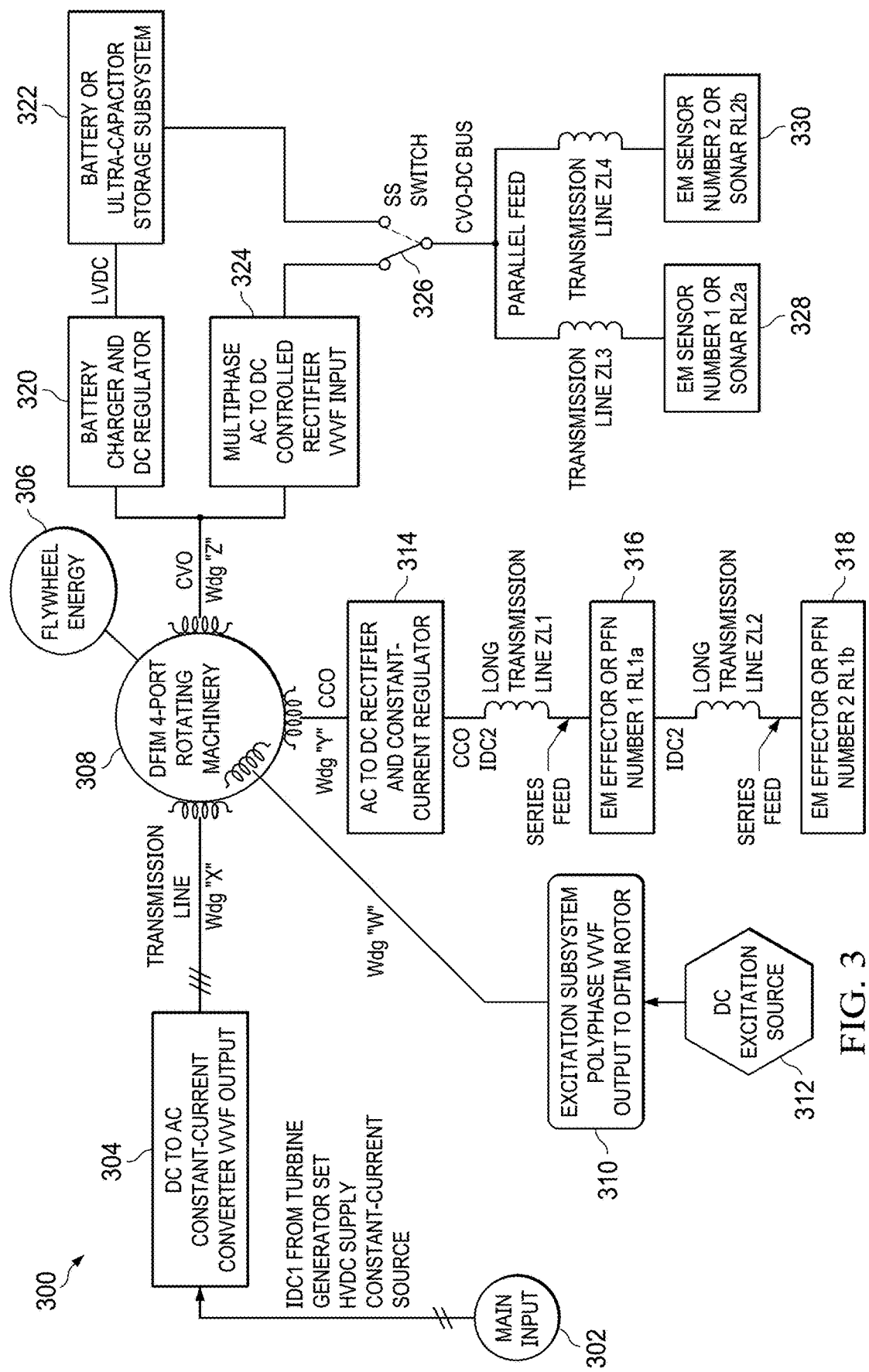
FIG. 3 illustrates a detailed configuration of an example submersible ESM with HVDC input according to this disclosure.

FIG. 3 shows a typical layout for the ESD 300 when configured as a submersible ESM with HVDC input according to this disclosure. As shown in FIG. 3, the ESD 300 includes a turbine generator 302, a DC to AC constant current converter 304, a DFIM 308 coupled to a flywheel 306, an excitation subsystem 310, a DC excitation source 312, an AC to DC rectifier and constant-current regulator 314, EM effectors or PFNs 316-318 connected in series, a battery charger 320, a battery or ultra-capacitor storage subsystem 322, a multi-phase AC to DC controlled rectifier 324, a switch 326, and EM sensors 328-330. A number of these components are similar to those shown in FIGS. 1 and 2, and a detailed description will not be repeated here.

The DFIM 308 has a constant-current AC input which is derived from the HVDC constant-current line coupled to the DC to AC constant current converter 304. The DFIM 308 has multiple output windings or ports which allow a simultaneous or separate combination of CCO and CVO from a common electrical machine stator assembly with multiple windings, Wdg1 and Wdg2.

Table 1 describes parameters of an embodiment for a four-winding electrical machine (such as the DFIM 308), which is the central element in each HESM 206-210 and controls the impedance levels of both CC and CV ports.

TABLE 1

| Port # | Electrical Machine Winding Designation | Functional Purpose | Electrical Time Constant | Impedance Level |
|---|---|---|---|---|
| 1a, 2a, 3a, . . . | Y | CC output to load | Tc1 | Z1 |
| 1b, 2b, 3b, . . . | Z | CV output to load | Tc2 | Z2 |
| 3 | X | CC Main DC input | Tc3 | Z3 |
| 3 | W | CC AC input for rotor excitation | Tc4 | Z4 |

In some operating modes, the time constants and impedance levels are ordered as follows for optimum performance:
Z4<Z3<Z1<Z2
and
Tc4<Tc3<Tc1<Tc2.

The transmission line impedances can be large due to the long distances between HESM units and loads. If the constant-current transmission line impedance is defined (as shown in FIG. 3) as ZL1 and ZL2, the system 200 allows operation in a Port #1 CCO mode as
ZL1>Z1 and ZL2>Z1 and ZL1+ZL2>Z1
where Z1 is the machine's effective output impedance per phase subsequent to rectification and regulator action.

Conversely, for the machine Port #2, the EM sensor loads are arranged in parallel, constant-voltage input, and it is clear that the two corresponding transmission line impedances must be limited as follows:
ZL3~Z3 and ZL4~Z3 and (ZL3*ZL4)/(ZL3+ZL4)<Z3
where Z3 is the effective impedance per phase of the electrical machine Port 1b or 2b or the ultra-capacitor output after the regulator or rectifier of the machine windings.

Figure 4:
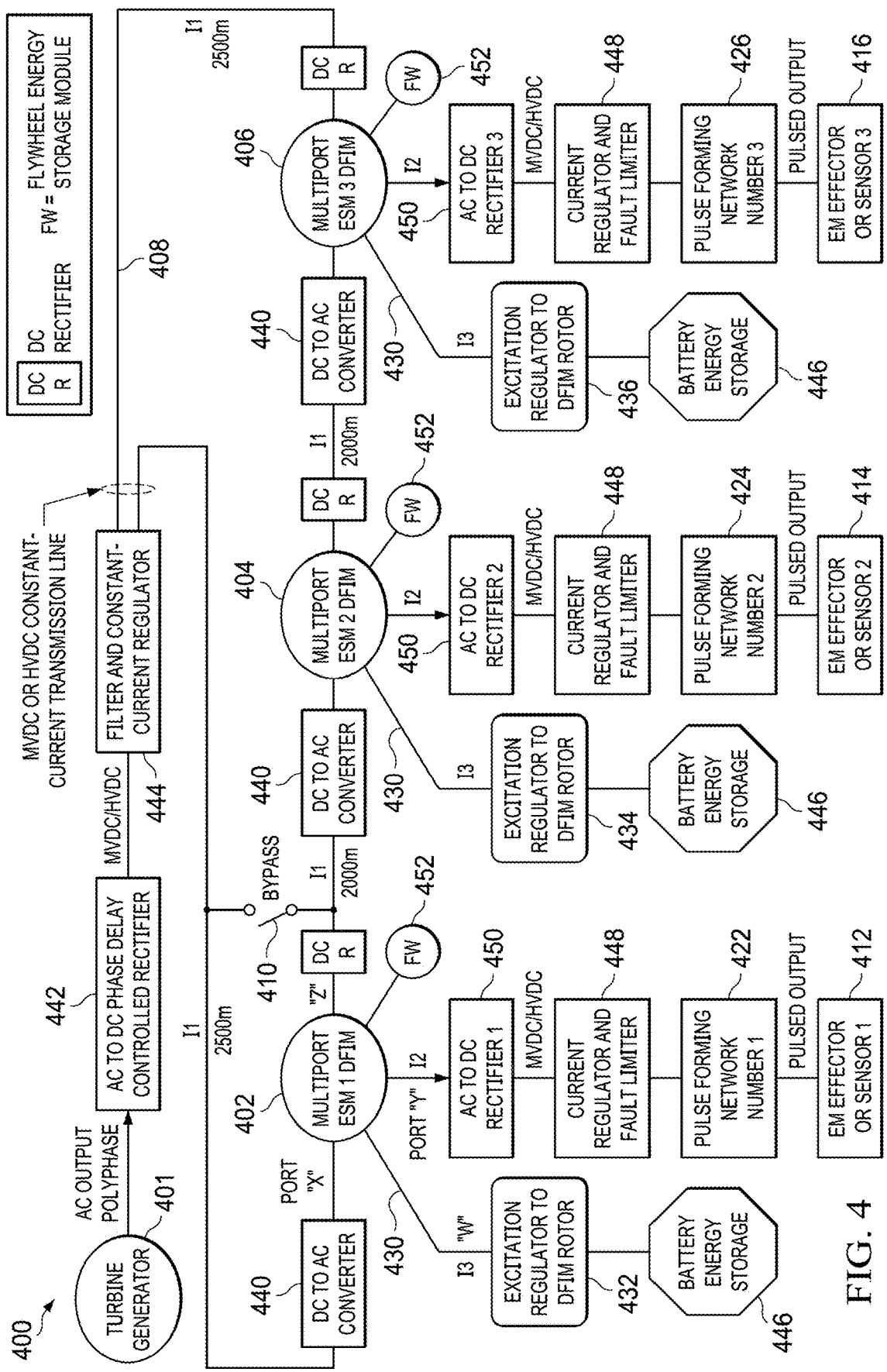
FIG. 4 illustrates another example submersible hybrid energy storage system according to this disclosure.

FIG. 4 illustrates another example submersible hybrid energy storage system 400 according to this disclosure. As shown in FIG. 4, the system 400 includes three subsea ESM machine sets 402-406 providing constant-current output to three separate EM effectors 412-416 and fed by a common long distance HVDC or MVDC (medium voltage DC) transmission line 408 from a main energy source or turbine generator 401. The EM effectors 412-416 represent different pulsed power loads that are fed by the ESM machine sets 402-406. The rotating machines operate with constant-current input, constant-current output, and a constant-current rotor excitation subsystem. The use of rotating machinery with a discrete rotor excitation circuit "W" provides maximum operational flexibility and also enhances overall system safety in the event of load faults. By example, the 9000 m long transmission line 408 is shown linking the three ESM machine sets 402-406 on a common constant-current line.

The system 400 also includes at least one bypass connection 410 (such as a shunt bypass switch) across the ESM machine set 402. If the ESM machine set 402 malfunctions, the bypass connection 410 can be closed to short out the station and bypass it while maintaining normal operations in the other two sets 404-406.

In some embodiments, the doubly-fed electrical induction machine (DFIM) of each ESM machine set 402-406 has a low reactance on its output and is close to the load (e.g., 10-20 feet away or less). This allows the system 400 to operate with a high slew rate of power and high current. This is an important characteristic of the system 400 and distinguishes the system 400 from steady state systems that experience substantial inductive drop and resistive drop, which limit the slew rate.

An AC-to-DC phase-delay controlled rectifier 442 and a harmonic filter/constant-current regulator 444 are connected to the power source 401 to yield a high-voltage constant-current source at the onshore station. An output current regulator and DC fault limiter 448 is fed from an AC-to-DC rectifier 450 connected to the DFIM output port "Y" operating at current $I_2$.

Each ESM machine set 402-406 incorporates a variable-voltage variable-frequency (VVVF) DC-to-AC converter 440 to convert the medium or high voltage DC transmission line power into a polyphase AC input for each machine winding. The machine winding may be, e.g., 3-phase, 6-phase, 9-phase, 12-phase or 15-phase, or any other suitable winding. The three wound rotor electrical machines all operate at identical input AC current levels in this arrangement. Consequently, the three output PFNs 422-426 are at the same charging rate since the PFNs 422-426 are assumed equal in size and energy rating. In a case where the output charging rates to the PFNs 422-426 or effectors 412-416 cannot be simultaneous and identical in current, the action of the field current I3 regulator in Port #4, winding "W" (indicated at 430) comes into use as follows to provide a difference current.

The preferred electrical machine is a wound-rotor induction machine with a polyphase rotor and polyphase excitation supply to the rotor from a VVVF inverter. An important criterion is the phasor equality that:

$$\vec{I1} + \vec{I3} = \vec{I2}$$

where $\vec{I1}$ =MMF phasor of the main input current loop, $\vec{I2}$ =MMF phasor of the load output current to the PFNs 422-426, and $\vec{I3}$ =MMF phasor of the field excitation or regulator current.

The phasor $\vec{I3}$ may be injected into the rotor circuit at an arbitrary phase angle and thus $\vec{I3}$ can be in-phase or out-of-phase with respect to the phasor $\vec{I1}$. The $\vec{I3}$ current (MMF) from the field current regulator is set at a different voltage/current level from the main input/output currents, and an amplification of the field power occurs in the wound-rotor induction machine. The amplification can be on the order of 100. Thus, a change in field power of 1 kW can cause output power to swing 100 kW. Closed loop control of the machine forms a stable feedback control system. A common response time would be on the order of 10 ms to 100 ms.

The field excitation regulators 432-436 require approximately 2% of the output power of each ESM machine set 402-406. This power is derived from a DC battery supply 446 that is included with all ESM sets and charged by a pilot generator on the main shaft of the flywheel 452.

Three general types of electrical machines may be used for the principal electro-dynamic conversion devices as follows:

Type A: Wound-rotor induction machine
Type B: Cage-rotor Induction machine
Type C: Permanent magnet rotor synchronous machine The Type A machine provides the maximum flexibility for the ESM (or HESM), and is able to operate in a bidirectional power flow mode, which is advantageous for the system 400. The use of a polyphase excited rotor winding permits a constant-current output of the machine with minimal use of power electronic apparatus under wide variations in shaft speed due to the reduction of kinetic energy of the integral flywheel. For example, the system 400 provides for a reduction in shaft speed to 50% of the baseline or 25% of the full kinetic energy, whereby rotor excitation is boosted in current and the voltage/frequency ratio is maintained to yield a near constant magnetic flux in the machine airgap.

Figure 5:
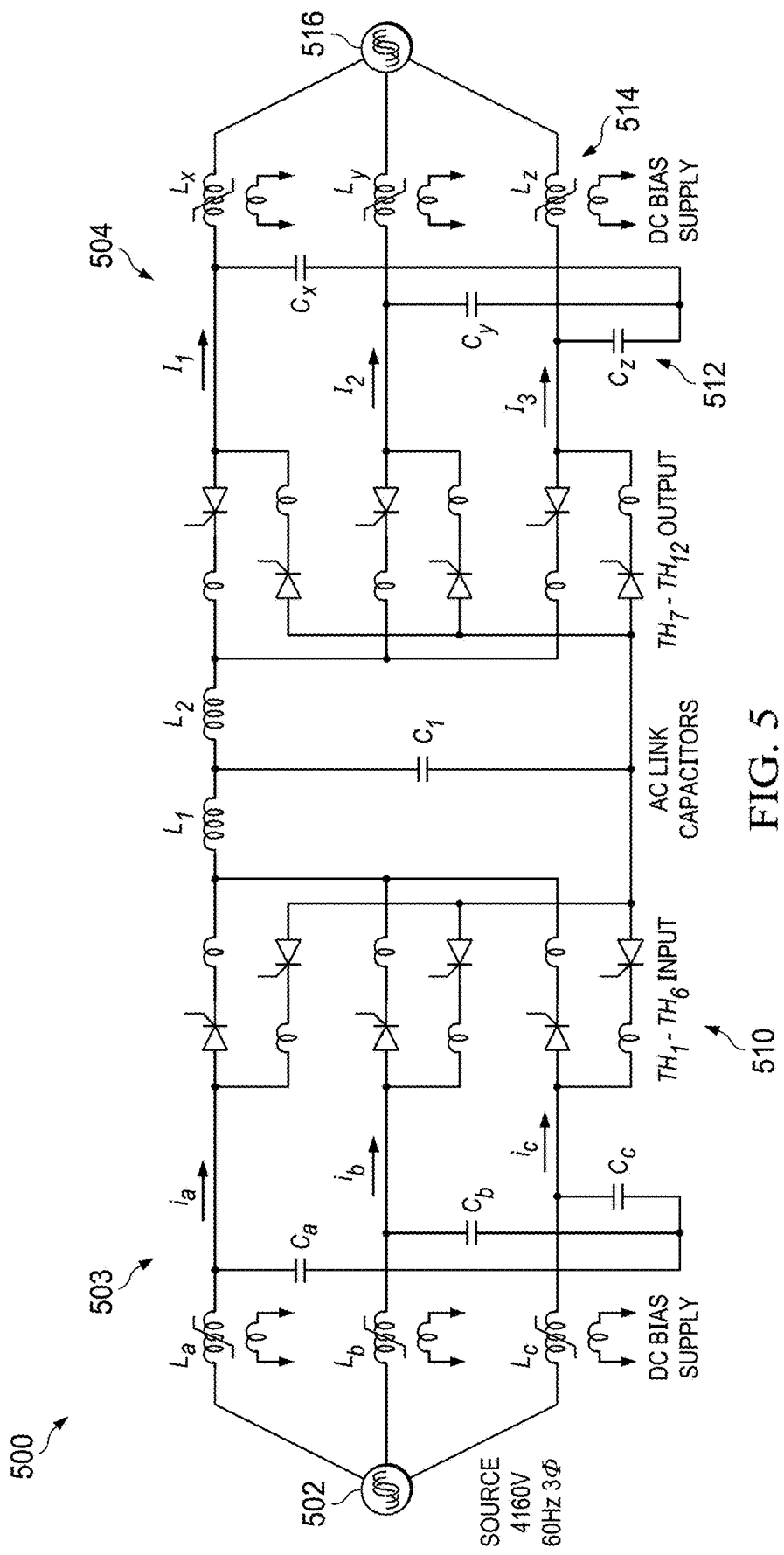
FIG. 5 illustrates an example system for use in a submersible pulsed energy storage system according to this disclosure.

FIG. 5 illustrates an example system 500 for use in a submersible pulsed energy storage system according to this disclosure. All or parts of the system 500 may be incorporated into any of the power systems disclosed herein. As shown in FIG. 5, the system 500 includes a power source 502, which can be, e.g., a turbine generator. The power source 502 provides power to an AC link input converter 503. The AC link input converter 503 includes a constant-current rectifier source 510 with a high voltage (e.g., 10-20 kV) output. The AC link input converter 503 is coupled to an AC link output converter 504 via a long transmission line. The transmission line has line lumped capacitance represented as C1 in FIG. 5. The transmission line also has line lumped inductance represented as L1 and L2 in FIG. 5. The system 500 can produce DC or low frequency (<=5 Hz) AC current as needed.

The system 500 also includes a constant-current inverter 504, which can be a PWM variable frequency high voltage inverter. The constant-current inverter 504 is coupled to high voltage saturable reactors 514, which are labeled Lx, Ly, and Lz in FIG. 5. The saturable reactors 514 feed an electrical machine-inertial storage ESM 516. In some embodiments, the ESM 516 is configured to store 25 MJ or more. Wye-connected capacitors 512 filter the inverter output and boost output voltage or power factor correction.

Figure 6A:
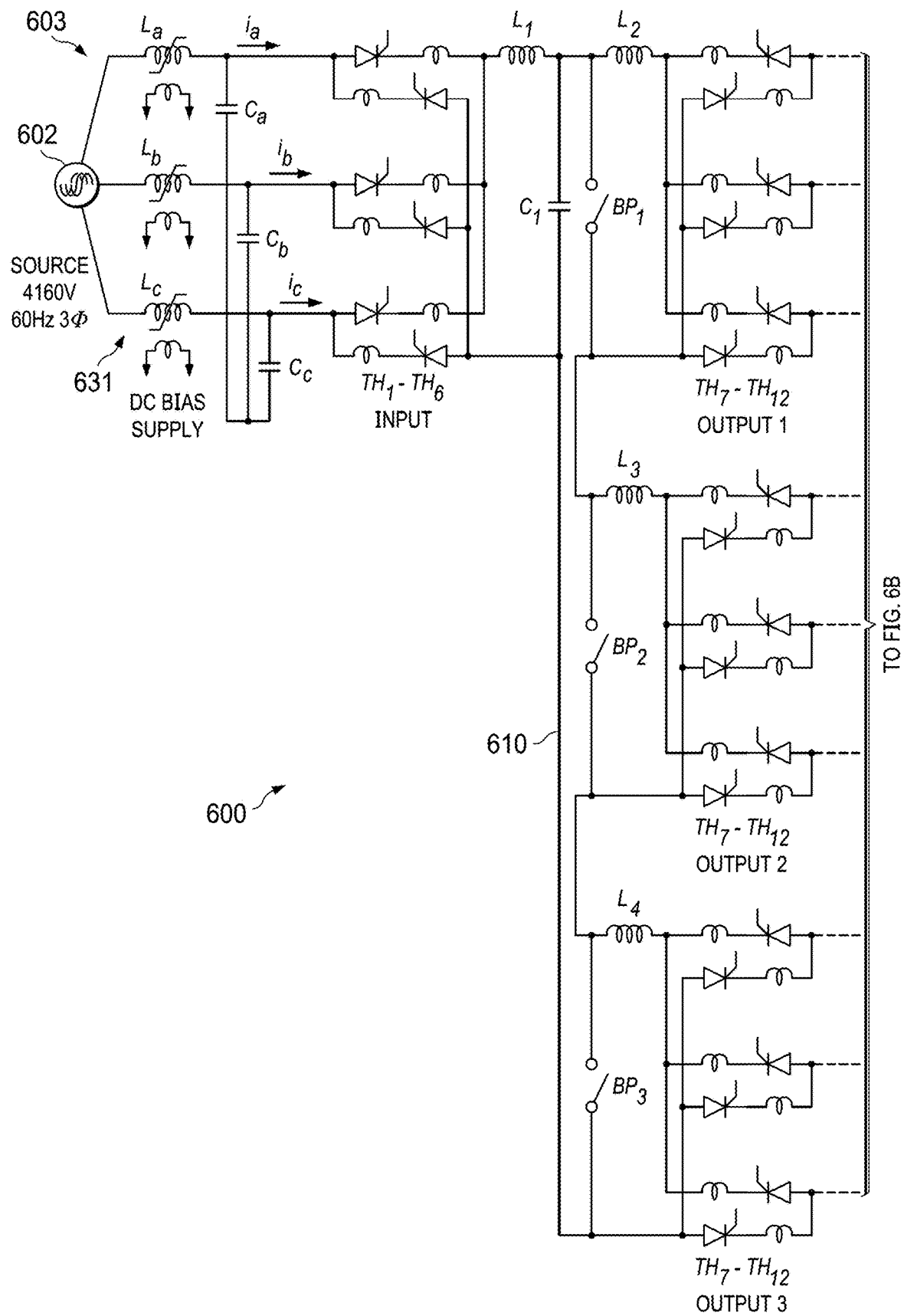
FIGS. 6A and 6B illustrate another example submersible pulsed energy storage system with a HVDC power conversion apparatus according to this disclosure.
Figure 6B:
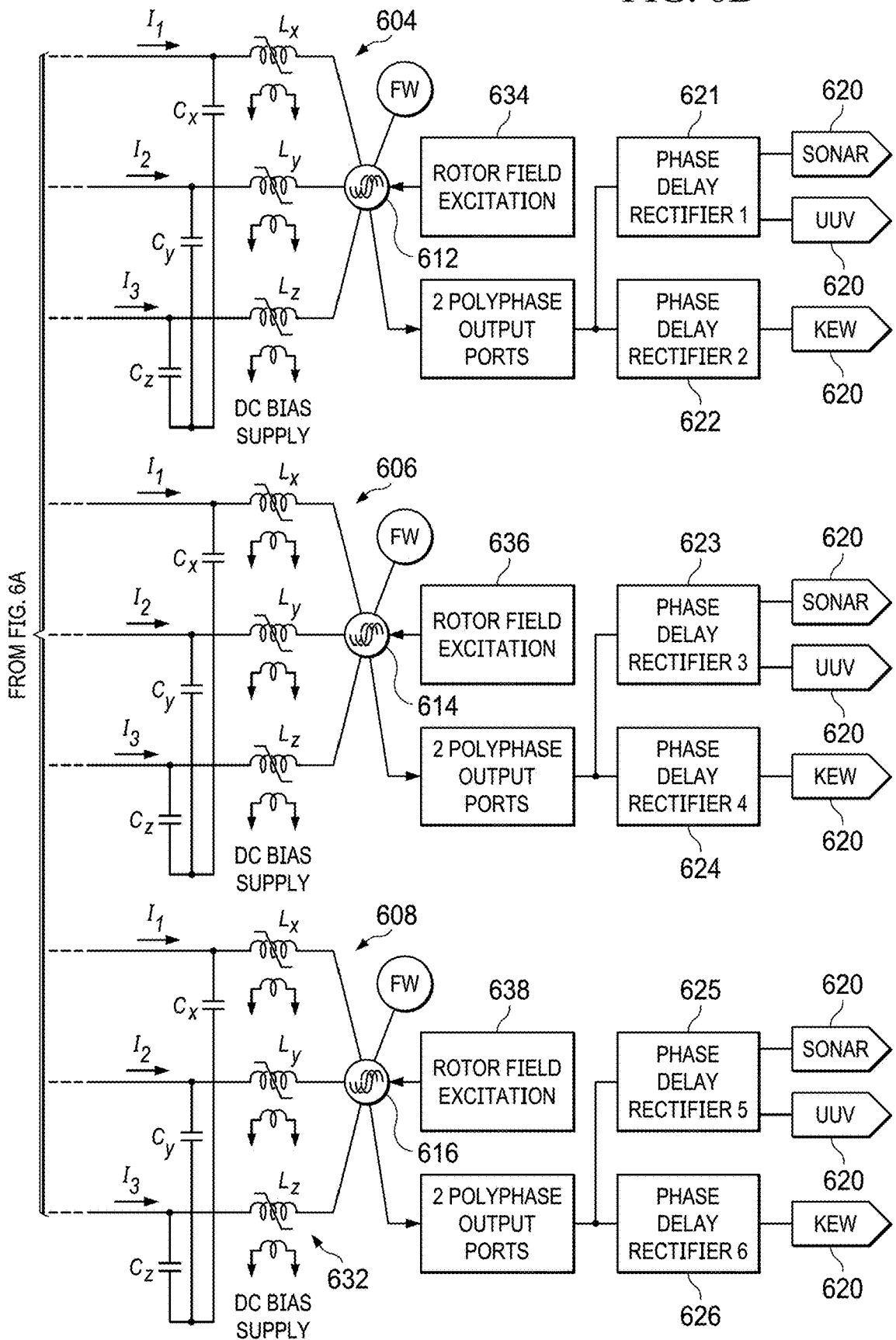

FIGS. 6A and 6B illustrate another example submersible pulsed energy storage system 600 with a HVDC power conversion apparatus according to this disclosure. The system 600 uses the system 500 of FIG. 5 in providing power to different types of loads.

In the system 600, electric power is generated onshore by the power source 602. The power source 602 can be, e.g., a turbine-driven generator, a solar array, a wind generator, an ocean wave kinetic generator, or an ocean polyphase-electric generator. The electric power is then converted to either DC or low frequency AC. The electric power is transmitted over a long distance transmission line 610 to the seabed and powers multiple power conversion modules 604-608, which are connected in series and individually operate DFIMs 612-616. Each DFIM 612-616 is equipped with an integral flywheel energy storage unit (ESU). In addition, each DFIM 612-616 uses a rotor field excitation supply 634-638, which has a smaller amount of stored energy through a battery or ultra-capacitor DC supply.

Each DFIM 612-616 is equipped with a separate input stator winding, which receives power from the high voltage transmission line 610, and multiple output stator windings, which are designed to feed a multiplicity of loads 620, such as Sonar, unmanned underwater vehicles, and kinetic energy weapons. The output winding ports of each DFIM 612-616 may be completely or partially rectified by the phase delay rectifiers 621-626 to produce a multiplicity of DC power outputs to feed the loads 620. In the system 600, the phase delay rectifiers 621, 623, 625 produce a low voltage DC output to Sonar and UUVs, whereas the phase delay rectifiers 622, 624, 626 produce a medium voltage DC pulsed power output for operation of a kinetic energy weapon or electromagnetic effector, such as an inductive torpedo launcher.

It is an important aspect of the system in FIGS. 6A and 6B that the ports of the DFIMs 612-616 feeding the phase delay rectifiers 621, 623, 625 have a different electrical time constant and different impedance level than the DFIM ports feeding the phase delay rectifiers 622, 624, 626. However, all output ports derive pulsed energy from the same source in each set, which is the flywheel ESU. In doing do, the output ports avoid large energy or power surges to appear on the incoming high voltage transmission line.

Control of power, current, and voltage is effected by two different means. The phase delay rectifiers 621-626 are effective in reducing the magnitude of the DFIM output voltage and also in cutting off power if the need arises, such as in a short circuit condition. A broader ranging control of power, current, and voltage is through the action of each rotor field excitation controller 634-638, which is a variable-voltage variable-frequency (VVVF) inverter drive having a DC input derived from the input of the main transmission line 610. The controller 634-638 drives a low frequency polyphase input to the dynamoelectric rotor of the DFIM 612-616, which in part compensates for the drop in rotor-flywheel speed during a discharge event, and in boosting rotor frequency, allows the stator output ports to maintain a nearly constant frequency output (albeit a much higher frequency than the rotor circuit).

The system 600 includes a preferred AC link input converter 603 at the source and three AC link output converters 604-608, where each output converter 604-608 feeds a corresponding electrical machine. The system 600 provides a number of technical advantages since the overall circuitry provides for efficient series stacking of identical output converters. Each AC link converter 604-608 includes saturable controlled reactors 631-632 inserted in series and connecting to either the source generator 602 or to the input terminals of the DFIMs 612-616.

The system 600 is well suited to high voltage DC or AC transmission where it is advantageous to operate the transmission line 610 as constant current with voltage and current regulation being performed by the source converter. Inductor L1 represents the transmission line principal inductance and C1 is the shunt line capacitance. If the power is AC, the transmission line 610 is a single-phase line. Inductors L2, L3 and L4 represent the portion of the transmission line 610 close to each subsea station. The power converters 604-608 take a constant-current input power and operate the electrical machine in either a constant-current or constant-voltage output mode for the purpose of accelerating the machinery in either a constant-power mode or a constant-current mode for constant torque acceleration.

In one embodiment, the DFIM 612-616 is first started from zero speed as a constant-current input. Then upon reaching base speed, the converters 604-608 revert to a constant-power model. As defined herein, the base speed is the lowest speed that the flywheel will normally operate at its maximum discharge point. For speed increases beyond base speed and up to maximum speed, the machine is in a "field weakening" mode, whereby the magnetic flux/pole is reduced yet output power remains constant. The frequency boost to the rotor excitation circuit is in inverse proportion to the flywheel shaft speed. This allows overall output frequency to be nearly constant over the entire discharge cycle. The DFIM 612-616 utilizes what is known as "field oriented vector" control for torque, power and speed regulation.

The output converter saturable reactors 632 in each phase are necessary to help provide current regulation of the DFIM 612-616, in addition to basic frequency and current regulation provided by the converters 604-608. In an experimental saturable reactor for a 5000 Volt AC power system and 1 MW rating, a variable inductance range of 60:1 was obtained with a DC saturable reactor operated from a 1-100 Amp DC power supply for control. For example, if the transmission line 610 suddenly reverts to powering only two stations instead of three, then each remaining saturable reactor 632 can be set to a 33% higher inductance value within a few milliseconds by control of the DC excitation current to the saturable reactors 632. It is clear that the number of subsea stations can be any number without limitation, provided the input applied voltage is high enough to allow for transmission line inductances over 1.0 Henry and for transmission reactance voltage drops of under 30% to be acceptable for load operations.

Each power converter 604-608 is provided with a bypass switch BP1, BP2, and BP3, which shunts each converter or DFIM in the event of a catastrophic device failure. Due to the high series inductance of the series transmission line 610, the most efficient way to transmit large blocks of power is with a constant-current system, for which inductances covering distances of 10-100 km are still practical. For example, with a system designed with a 25 kV transmission input voltage, and operated at low frequency AC input, even if the line reactive drop is 3 kV or 12% drop, this still constitutes a practical system. If three subsea stations are series connected on a 25 kV line and with a 3 kV line drop, then each station receives at least 7.2 kV, which becomes the VVVF inverter input voltage level.

The system 600 advantageously provides buffering of the input power source 602 from pulsating loads due to the combined action of the energy storage flywheel and DFIM basic regulation characteristics. As an illustrative example, if the final output load is pulsing at a rate of 20 MW/s, the source generator 602 can be buffered to limit source power to a slew rate of 0.5 MW/s, which extends the lifetime of the input power source and reduces the size and cost of the "tether" cable of the transmission line 610 to a minimum. Thus a 40:1 buffering ratio is practical at the megawatt power level. The system 600 is practical for a wide range of subsea energy modules that operate essentially independent of the shore power source 602.

Figure 7:
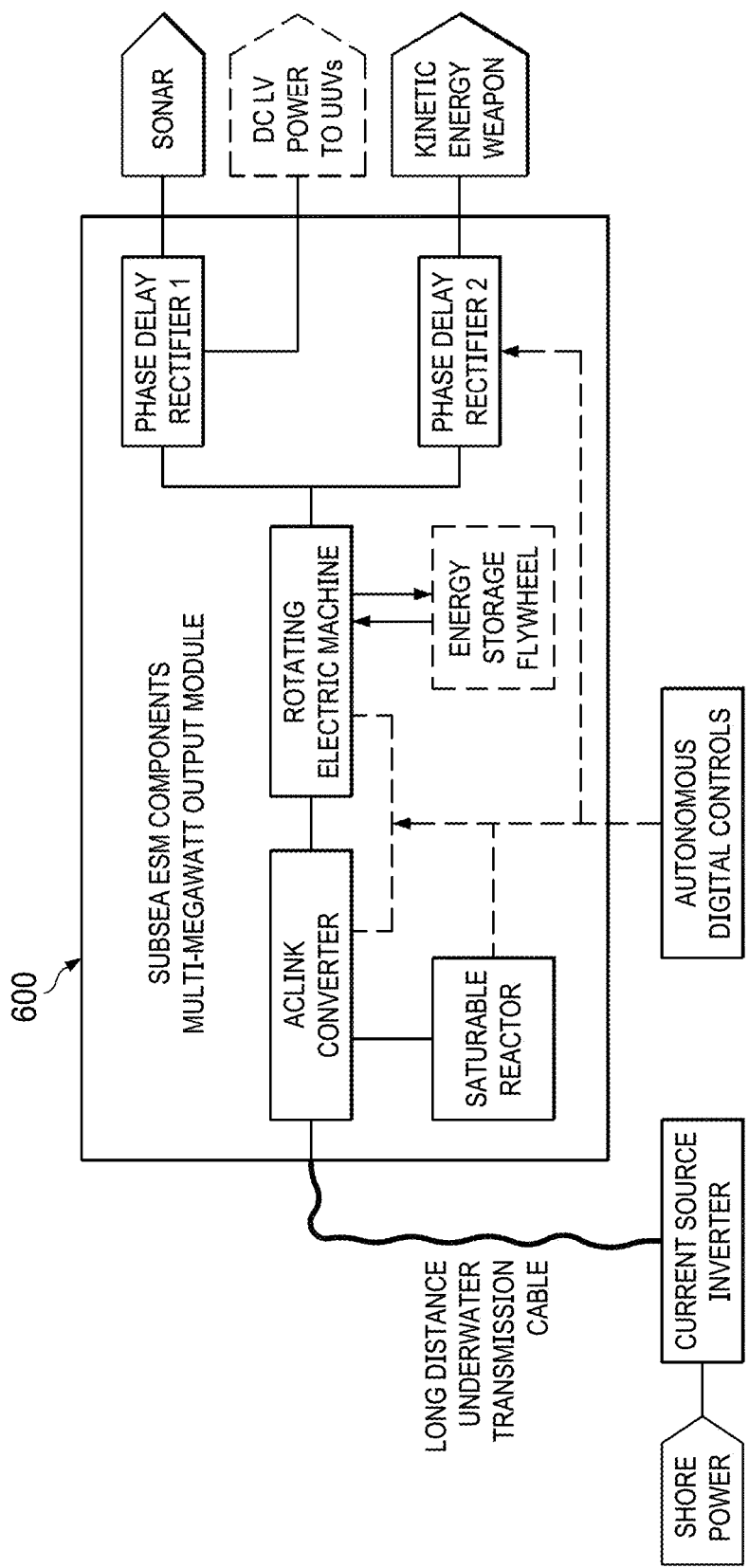
FIG. 7 illustrates a simplified diagram of the system of FIGS. 6A and 6B.

For ease of understanding, FIG. 7 illustrates a simplified diagram of the system of FIGS. 6A and 6B, where multiple components of the system 600 are consolidated into single blocks.

Figure 8A:
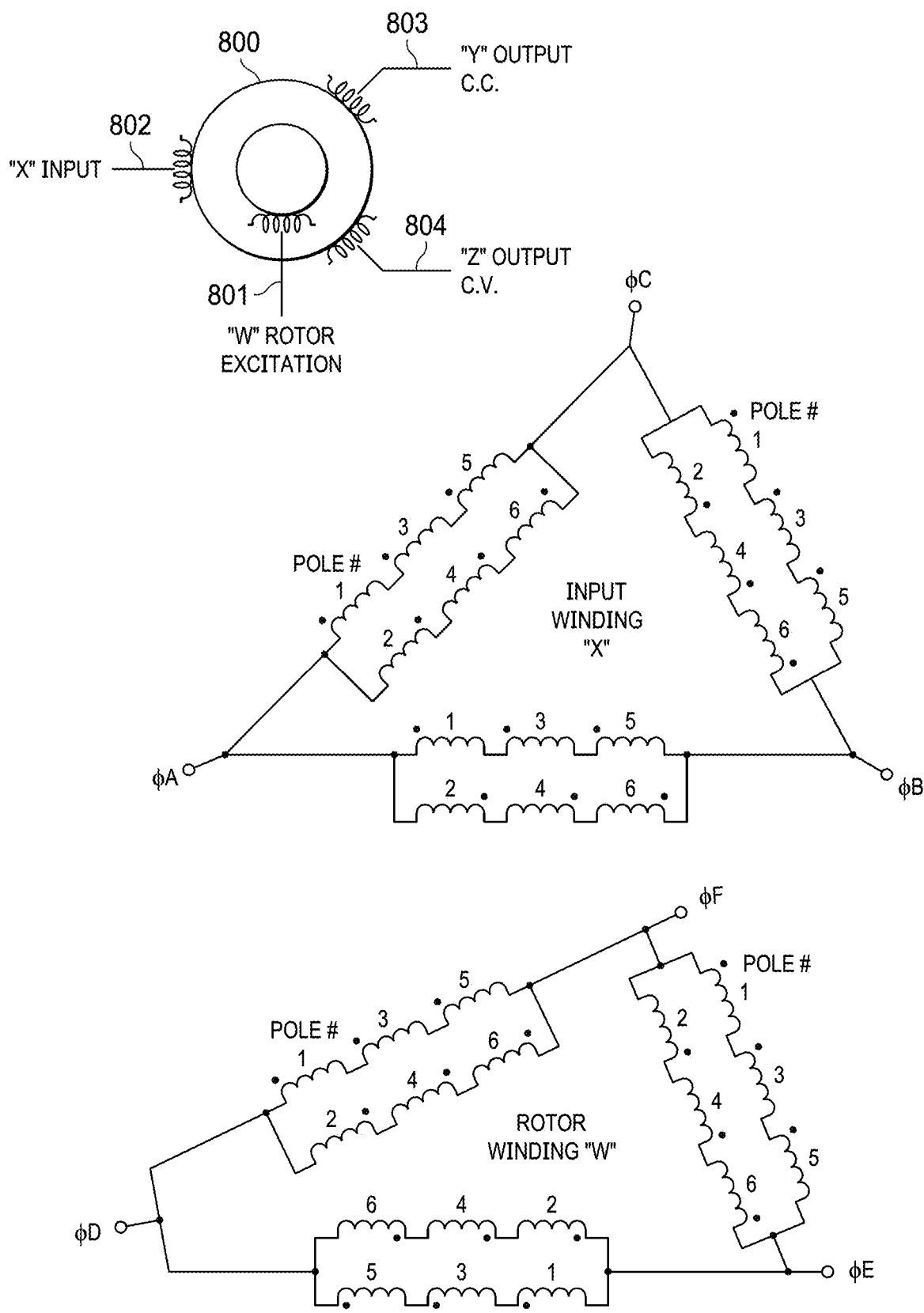
FIGS. 8A-8C illustrate a winding configuration for a doubly-fed electrical induction machine (DFIM) according to this disclosure.
Figure 8B:
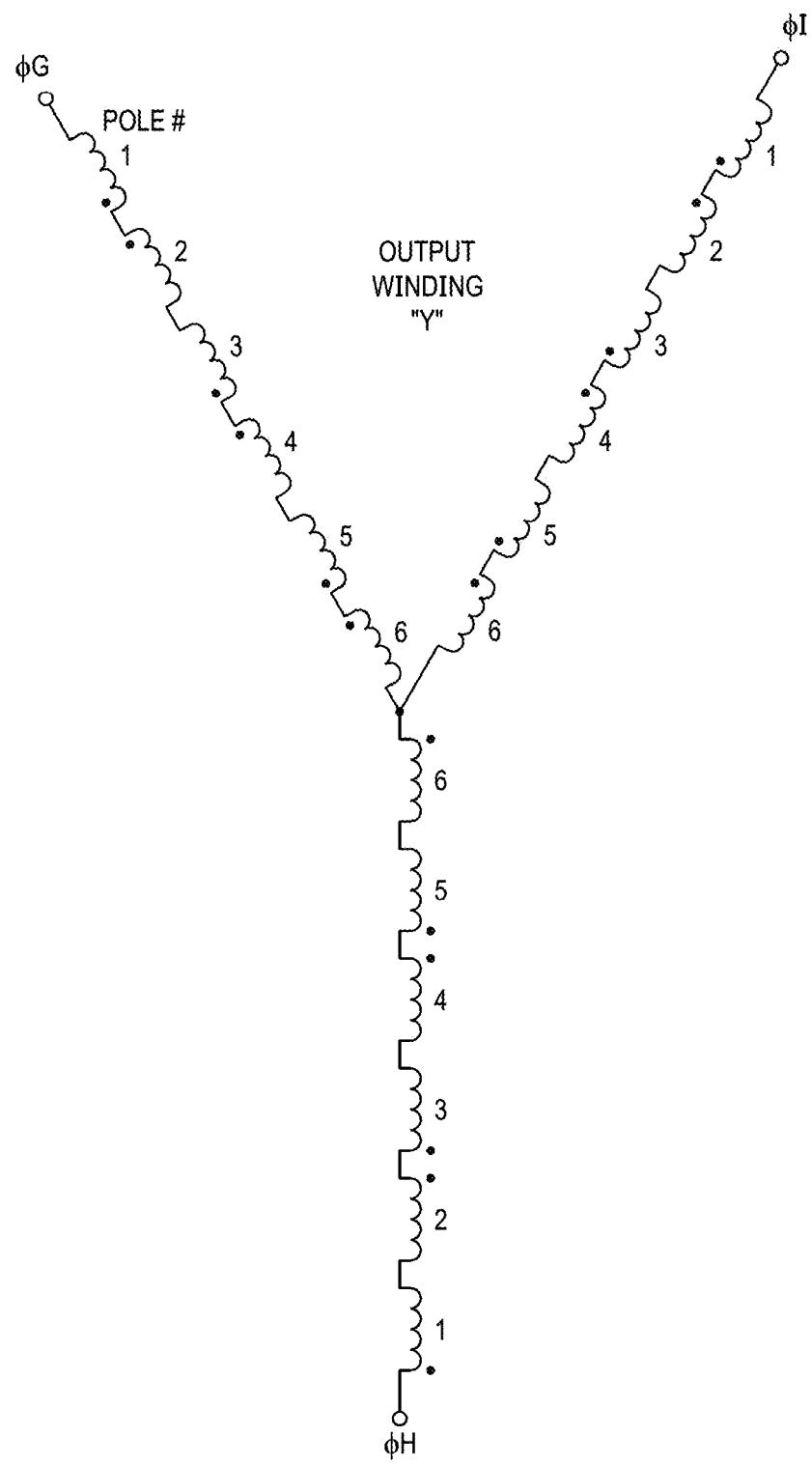
Figure 8C:
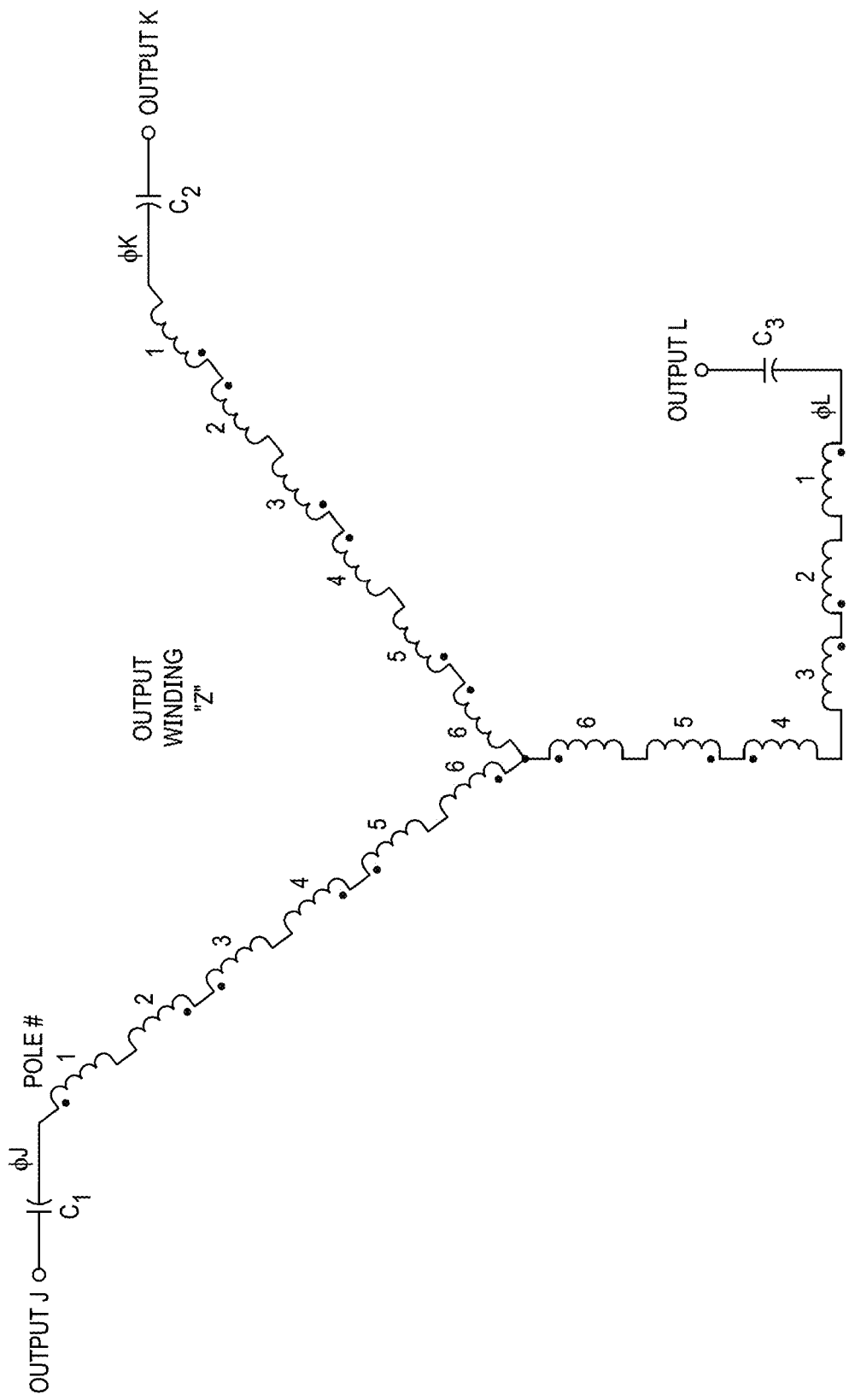

FIGS. 8A-8C illustrates a winding configuration for a DFIM 800 according to this disclosure. The DFIM 800 may represent (or be represented by) any of the DFIMs disclosed herein (e.g., the DFIMs 612-616). The DFIM 800 is a six pole wound rotor induction machine with three stator windings and one rotor winding suitable for HESM with both constant-current and constant-voltage output for either steady state or pulsed loads. As shown in FIG. 8A, the DFIM 800 includes one rotor port 801 and three stator ports 802-804. The rotor port 801 includes a rotor excitation winding "W." The stator ports 802-804 comprise one input polyphase winding "X" and two main output windings "Y" and "Z" for constant-current and constant-voltage power control. Details for each winding are shown in Table 2, and a more detailed diagram of each winding is shown in FIGS. 8A-8C.

TABLE 2

| | Function | Relative Power Level |
|---|---|---|
| Delta Winding "W" | Excitation for Rotor Circuit-LVAC | 2% |
| Delta Winding "X" | Medium Voltage Input Power @constant current | 100% |
| Wye Winding "Y" | Constant-current Output Power | 60% |
| Wye Winding "Z" | Constant-voltage Output Power | 40% |

Each winding is polyphase. Winding "W" baseline is 3-phase. Windings "X", "Y", and "Z" are higher order, such as 6-phase, 9-phase or 12-phase to reduce machine harmonics. The frequency f applied to winding "X" is related to shaft speed N according to the equation:

$$f=p*N/(60(1-\delta))$$

where N represents shaft RPM, p represents pole pairs, and $\delta$ is per unit slip of the induction machine.

Winding "Y" is a series connected wye winding that yields constant current when input winding "X" is fed by constant current. The impedance level of winding "X" can be independent of winding "Y" to suit the particular application. The impedance of each winding can be calculated approximately as:

$$Z_y = k_y N_y^2 P_y \omega$$

$$Z_x = k_x N_x^2 P_x \omega$$

where $k_x$, $k_y$ are design constants, N represents the number of series turns/phase, P represents the magnetic permeance of each magnetic circuit, and $\omega$ represents the electrical frequency of magnetic flux in the core. The arrangement of a pulse forming network (PFN) as a load for winding "Y" is shown in FIGS. 9 and 10 below.

The constant-voltage winding "Z" has a series capacitor per phase which ensures that the winding delivers a nearly constant-voltage characteristic over a broad range of excitation magneto-motive force. The capacitors $C_1$, $C_2$ and $C_3$ of winding "Z" are matched to each winding to create a resonant circuit and null-out the main leakage reactance component of each machine winding. Having windings "Y" and "Z" be wye connected minimizes the circulating currents in each winding. Having winding "X" in delta ensures that triple frequency harmonics are cancelled.

Figure 9:
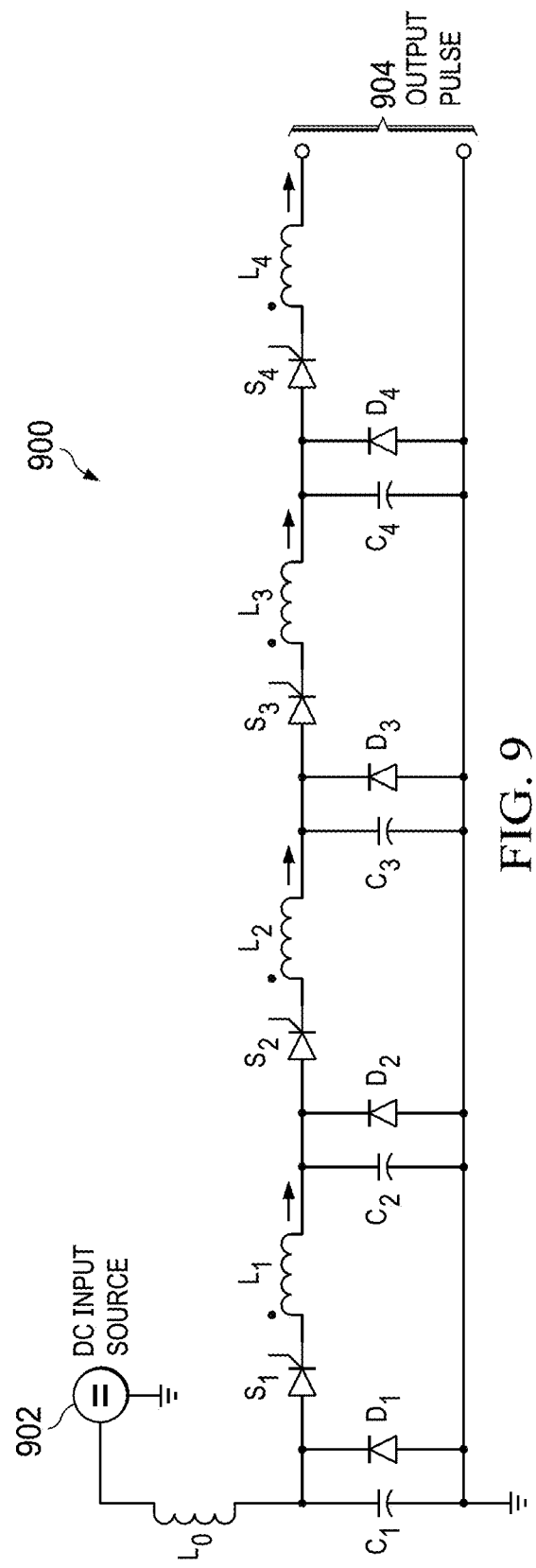
FIG. 9 illustrates a cascade arrangement of a four-stage high power pulse forming network (PFN) according to this disclosure.

FIG. 9 illustrates a cascade arrangement of a four-stage high power PFN 900 according to this disclosure. As shown in FIG. 9, the PFN 900 includes a DC input source 902, an output 904, and a cascade arrangement of stage switching controlled by output electronic switches S1-S4, whereby S4 is fired first, followed by S3, then S2, and last S1. The PFN 900 effectively delivers a constant-current output with a controlled rapid rise time. Each switch S1-S4 may be a thyristor, MOSFET, or IGBT, which is commanded to fire when load current is required. Sequential modulation of the output pulse by these switches occurs. Diodes D1-D4 protect the high energy DC capacitors C1-C4 from reverse voltage. The requirement for a constant-current charging cycle is met as initially the PFN 900 is charged by constant current through inductor L0, and after a specific energy charge is given, the charging mode is changed to a constant-power mode for the remainder of the charging cycle.

Figure 10:
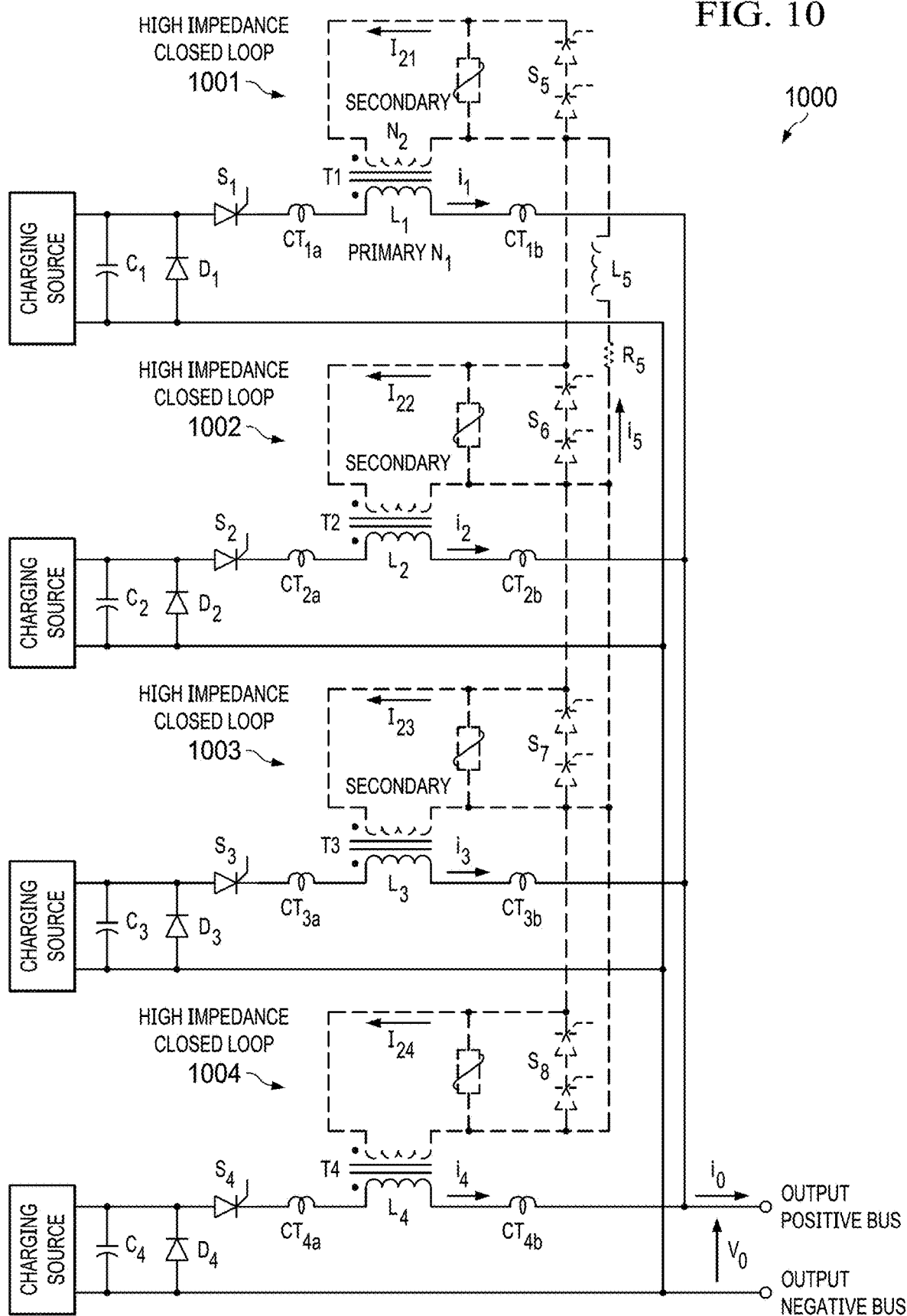
FIG. 10 illustrates another four-stage high power PFN according to this disclosure.

FIG. 10 illustrates another four-stage high power PFN 1000 according to this disclosure. As shown in FIG. 10, the PFN 1000 has a parallel discharge mode with four thyristor output switches S1-S4 and four coupled high-impedance closed-loop circuits 1001-1004 for fault reduction. The PFN 1000 provides a circuit that is efficient for very high current outputs having multiple stages in parallel and controlled for sequential timing.

Figure 11:
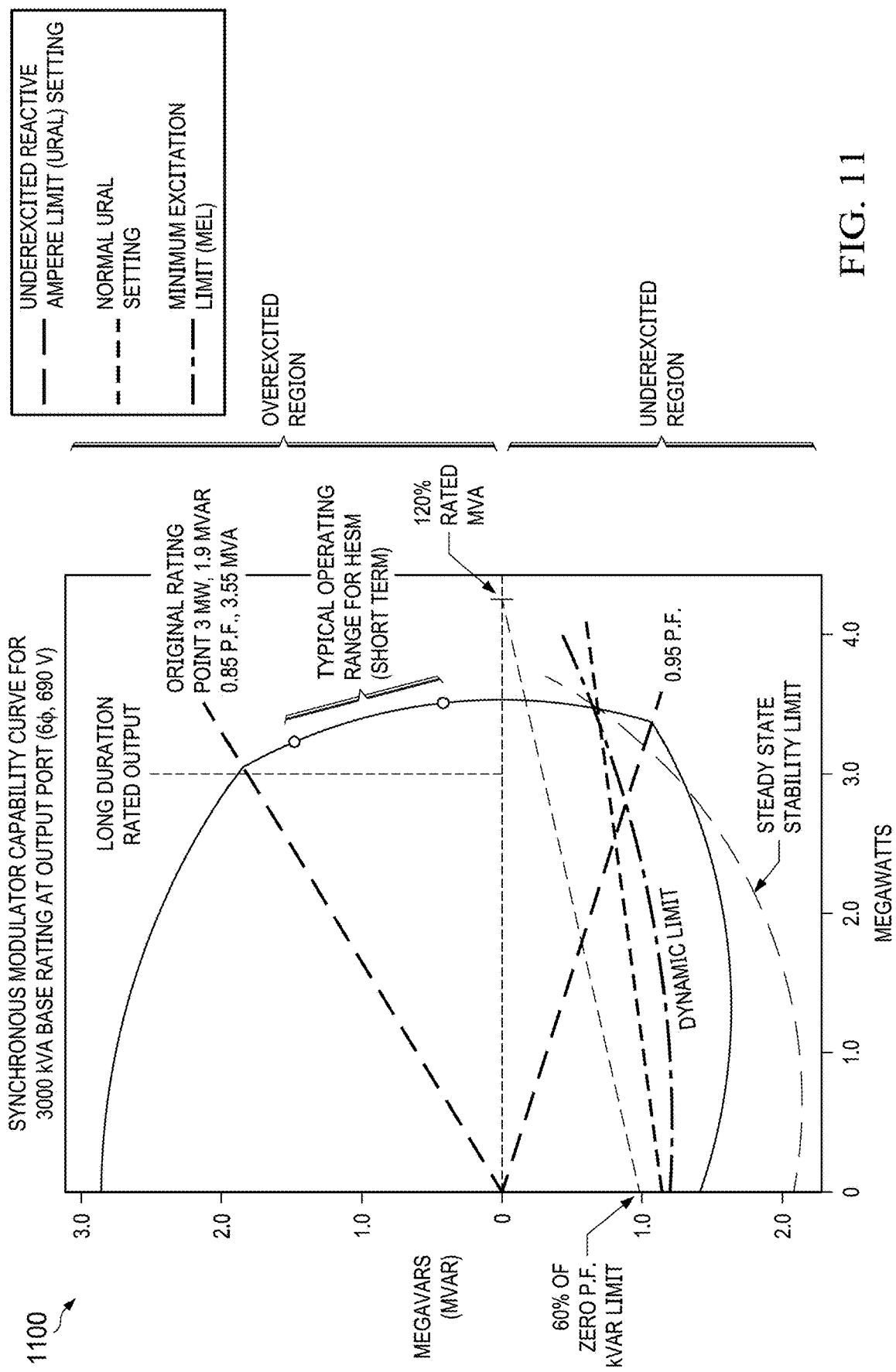
FIG. 11 illustrates a capability curve for a synchronous modulator used in the power systems of this disclosure.

FIG. 11 illustrates a capability curve 1100 for an electrical machine used in the power systems of this disclosure. As shown in FIG. 11, the curve 1100 is plotted with reactive power (megavars) on the vertical axis and real power (megawatts) on the horizontal axis. The curve shows both dynamic limit and steady state limit of operation of the doubly-fed induction machine with low-frequency closed loop rotor frequency control.

Figure 12:
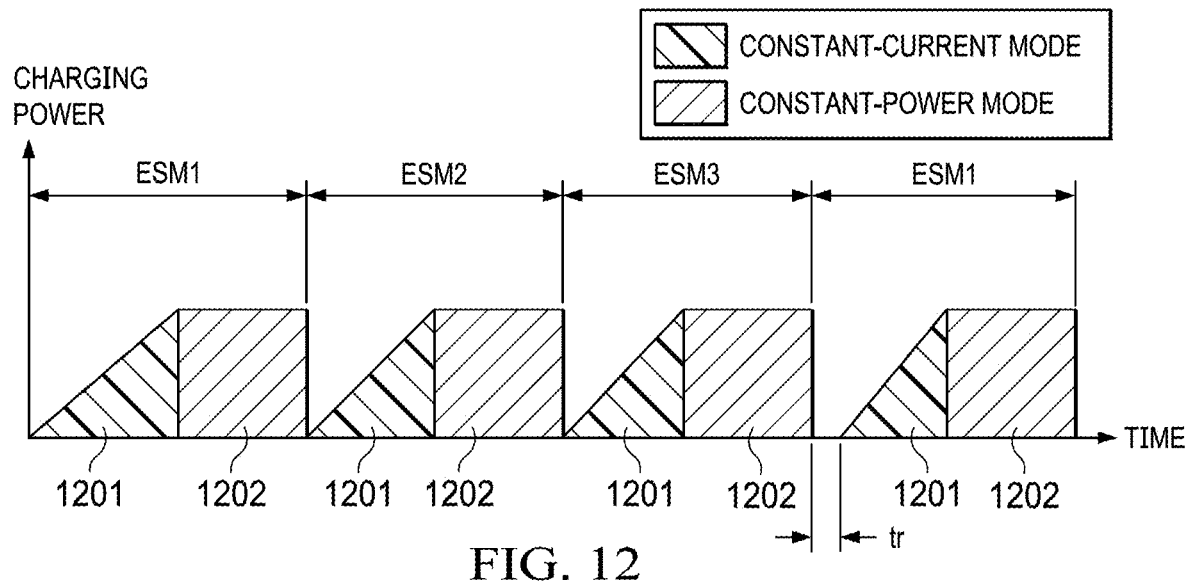
FIG. 12 illustrates a typical charging power sequence for an EM effector.

FIG. 12 illustrates a typical charging power sequence for an EM effector. As shown in FIG. 12, three pulse cycles occur sequentially for three ESMs, identified as ESM1-ESM3. The three pulse cycles are followed by a rest period tr. Each pulse cycle includes a constant current mode 1201 followed by a constant power mode 1202. After the rest period tr, the sequence of three pulse cycles can repeat. In this sequence, charging for each ESM occurs one at a time.

Figure 13:
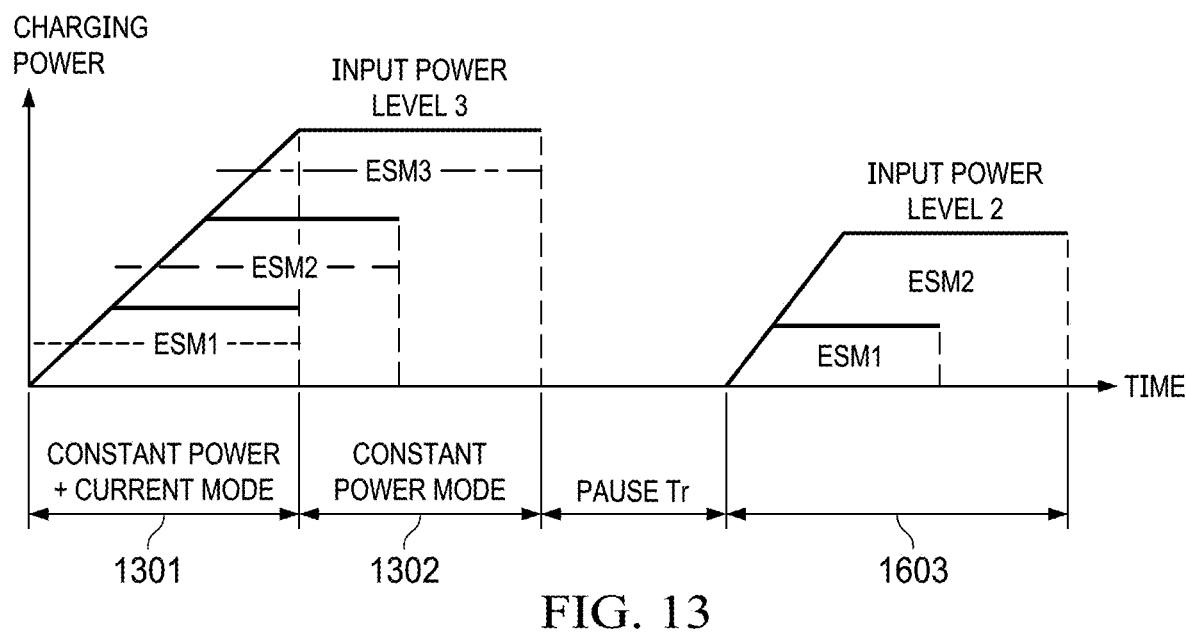
FIG. 13 illustrates an example of a charging power sequence according to this disclosure.

FIG. 13 illustrates an example of a charging power sequence according to this disclosure. As shown in FIG. 13, a combined constant-current and constant-power mode 1301 is followed by a constant-power mode 1302. Charging sequences for the three ESMs ESM1-ESM3 overlap, such that during part of the combined constant-current and constant-power mode 1301, all ESMs ESM1-ESM3 are recharged simultaneously. Thus, it is not necessary to charge the ESMs one at a time. In later modes, a limited number of ESMs can be charged.

Figure 14:
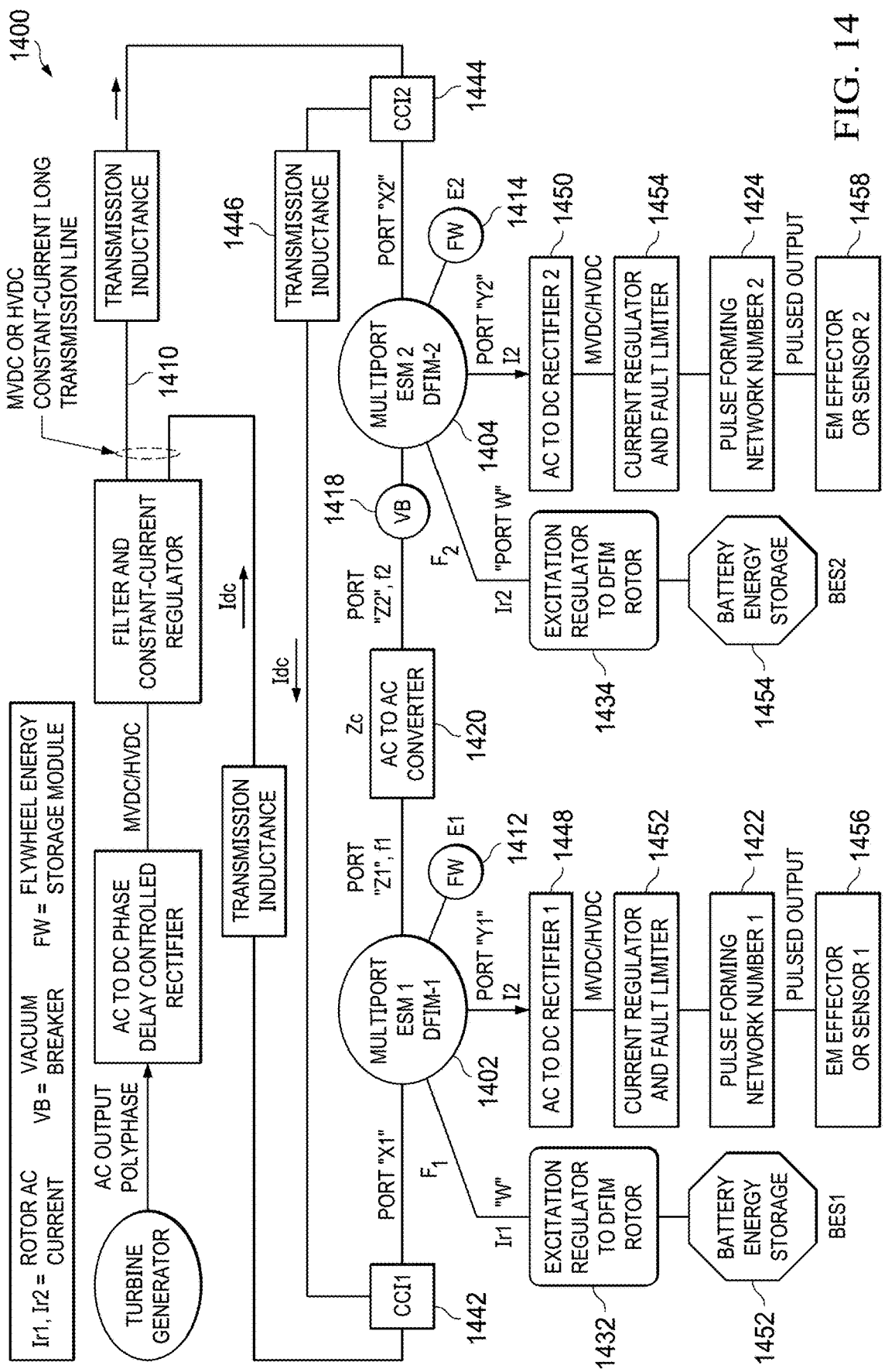
FIG. 14 illustrates another example submersible pulsed energy storage system according to this disclosure.

FIG. 14 illustrates a highly specialized example submersible pulsed energy storage system 1400 according to this disclosure. Each machine has three stator ports and one rotor port. As shown in FIG. 14, the system 1400 includes two DFIMs 1402-1404 directly coupled to independent flywheel storage units 1412-1414 in combination with a long-distance DC constant-current transmission line 1410 having a transmission inductance 1446. In the system 1400, energy is transferred from the DFIM 1402 to the DFIM 1404 or vice versa when one machine is discharged ahead of the other and it is desired to equalize stored kinetic energies among multiple sets. Therefore, an AC to AC converter 1420 (e.g., an AC link converter) provides bidirectional power flow between DFIM 1402 and DFIM 1404, which have winding impedances Z1 and Z2, intermediate AC current 12, and vacuum "tie" breaker 1418. The current I2 is variable-frequency polyphase current. If the speed of the DFIM 1402 is higher than that of the DFIM 1404, then the converter 1420 changes frequency f1 to lower frequency f2 so as to maintain a slip value on the winding Z2 of the DFIM 1404 within a high efficiency range, e.g., 1% to 5%. This frequency f2 can be constantly regulated as the machine speed changes to equalize rotor shaft speeds and therefore equalize inertial energy among the two sets.

The output windings Y1 and Y2 of the DFIMs 1402-1404 provide both constant-current and constant-power output depending on the mode of excitation of the rotor current Ir1 and Ir2, which are independently controlled. If constant-current output to a PFN 1422-1424 is required, the rotor is excited in a constant-current mode and energy is extracted from the flywheel storage units 1412-1414. If constant power is desired, the rotor is excited in a constant-power mode from inverters 1432-1434 and energy is also extracted from the flywheel storage units 1412-1414 at typically a higher rate. The amplification factor AF is different for these modes as follows:

Constant Current Mode $AF2a = Ny*Iy1/(Nr*Ir1)$
Constant Current Mode $AF2b = Ny*Iy2/(Nr*Ir2)$ where Ny=series turns/phase for "Y" stator winding and Nr=series turns/phase for excitation winding of the rotor circuit.

Constant Power Mode AF1$a$=Py1/Pr1
Constant Power Mode AF1$b$=Py2/Pr2 where Py1=output power of ESM1, Pr1=excitation power for ESM1 e.g. 2% of baseline, Py2=output power of ESM2, and Pr2=excitation power for ESM2 e.g. 2% of baseline. If DFIM 1402 is identical to DFIM 1404, then AF2$a$=AF2$b$ and AF1$a$=AF1$b$.

During the charging mode, independent of ramp rate, the current Ir1=Ir2, since all machines in the main driving constant-current loop have identical AC currents by action of the input DC to AC converters 1442-1444. If the respective flywheels 1412-1414 are at different energy levels E1 and E2 at initiation of a charge, the difference in charging energy may be supplied by the excitation circuit through currents Ir1 and Ir2 to allow each flywheel set to attain equal stored energy capacity prior to the start of the output cycling. Battery energy storage sub-systems BES1 and BES2 supply the excitation inverters F1 and F2 respectively and are capable of providing e.g. 2-5% of baseline output as required full excitation power. In addition to Ir1 and Ir2 regulation, the interconnection of stator windings Z1 and Z2 also allows transfer of energy among sets, to equalize all ESM inertial energy levels if desired.

The main energy transfer between sets occurs in two general modes:

1. In a charging cycle from main source, small adjustments in energy delivered to each set are made by excitation system rotor-field current adjustments to Ir1 and Ir2 fed from the battery sources 1452-1454 through the inverter subsystems 1432-1434 providing DC to AC conversion. Current feedback for control of the Ir1 and Ir2 current is from a current sensor located on the DC line feeding the PFNs 1422-1424.

2. When the main charging cycle is complete, the main transmission converters 1442-1444 are OFF and major adjustments in stored energy per ESM are made by controlling I2 current through the bidirectional converter 1420. This mode allows for sequential or non-sequential firing of the PFNs 1422-1424 into loads.

As shown in FIG. 14, the system 1400 also includes other components, such as the AC-to-DC rectifiers 1448-1450 that feed output current regulator and DC fault limiters 1452-1454, and the EM effectors 1456-1458 that represent different power loads that are fed by the ESM machine sets 1402-1404.

FIGS. 15A-15D shows different examples of power delivery sequences performed over time by the energy storage systems according to this disclosure, whereby multiple types of pulsed loads are sequentially powered.

Figure 15A:
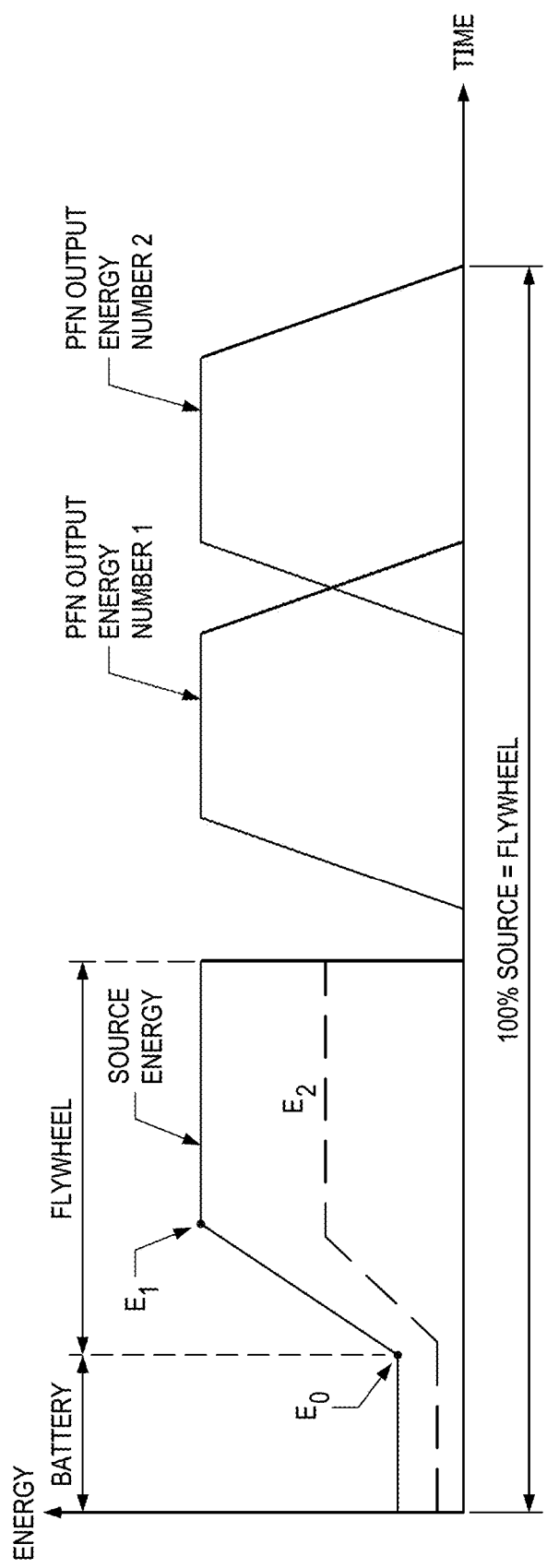
FIGS. 15A-15D shows different examples of power delivery sequences performed over time by the energy storage systems according to this disclosure.

FIG. 15A shows that, in the most basic case, all ESMs are charged simultaneously in a constant-current loop at equivalent rates. Likewise, all ESMs are discharged, although sequentially, to approximately the same depth of discharge. In this mode, all charging power from the source goes into flywheel and/or battery charging.

Figure 15B:
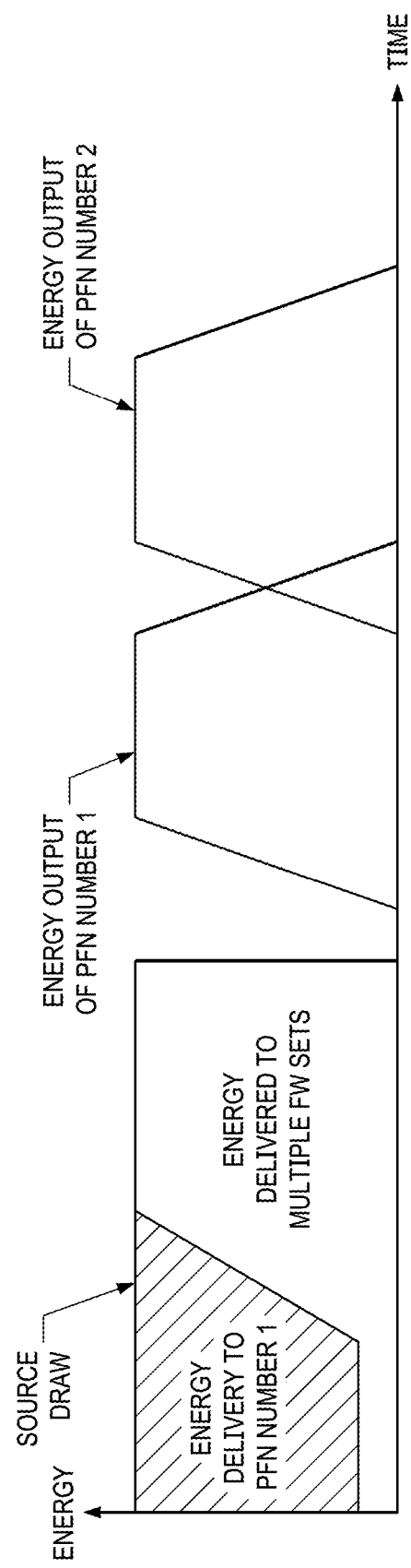

FIG. 15B shows a mixed use case, in which the source charging power is divided between charging the flywheel and charging the battery subsystems, which provide power directly to the PFN storage capacitors and ultimately the output effectors. In this mixed configuration, there is no efficiency penalty on either main power system or the DFIM, however the rate of energy delivery to the PFN is reduced in comparison to the flywheel providing energy to the output PFN.

Figure 15C:
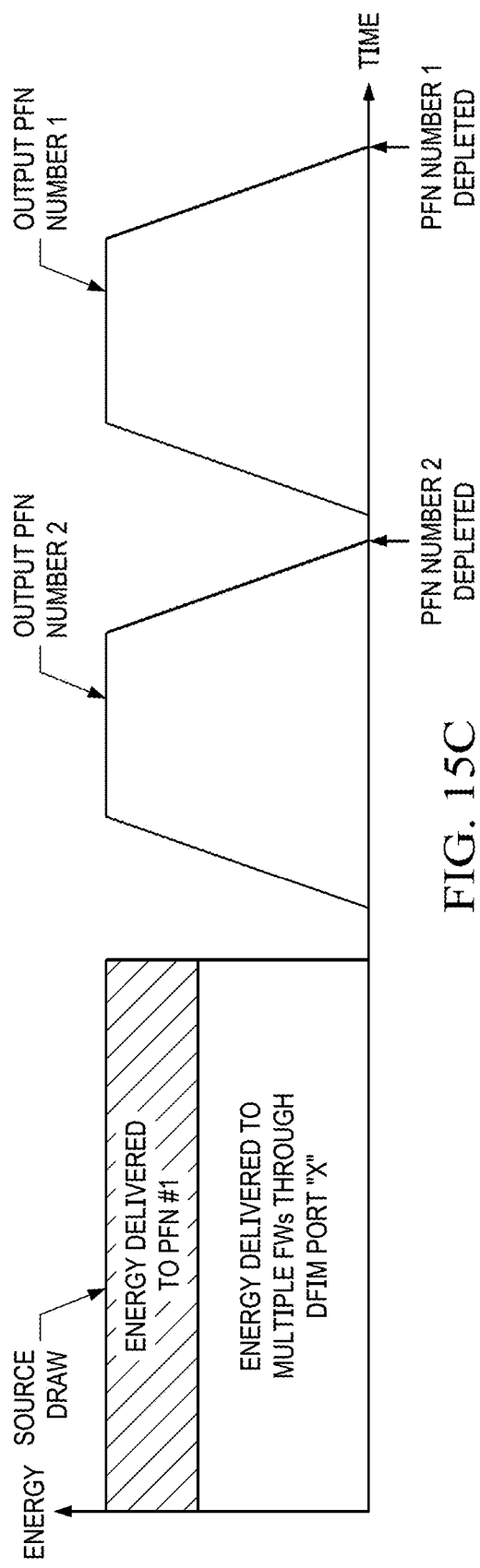

FIG. 15C shows a constant energy delivery to a set of multiple flywheels through winding port "X", and simultaneously supplying one PFN with a constant energy charge in the first time block. In the first time block, the turbine generator supplies constant energy to all combined loads. Subsequent energy delivery to PFN1 and PFN2 are ramped up and ramped down.

Figure 15D:
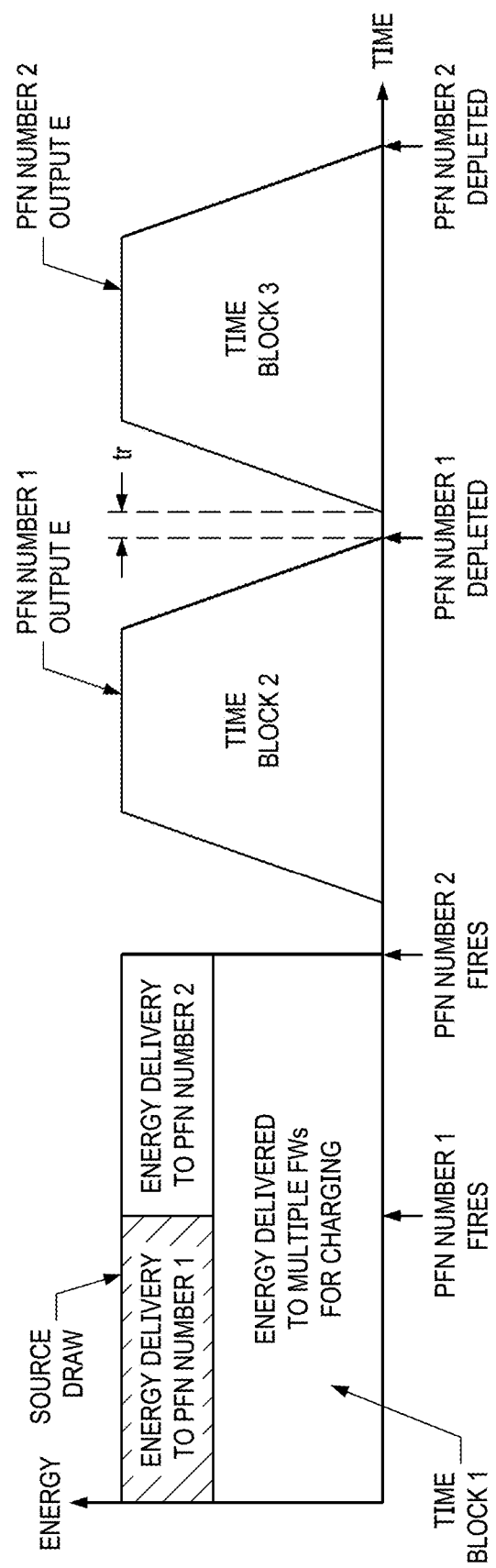

FIG. 15D shows a special case in which part of the initial charge is divided in time block 1 between two PFNs #1 and #2. In addition, the initial charge simultaneously delivers charging energy to multiple flywheel sets. PFN #1 is fired halfway through time block 1, at which point the same energy is diverted to PFN #2. Subsequent to PFN #2 being discharged, the repetitive cycle starts in time block 2, with PFN #1 being ramped up in a fixed time period to attain full energy and then depleted at end of time block 2. PFN #1 is left at zero state charge after 50% of time in time block 1. PFN #2 is fully discharged at the end of time block 1. After a rest period $t_r$, the controlled ramp-up cycle proceeds with PFN #2 attaining full charge in time block 3 (PFN #1 is kept at zero charge state), and finally PFN #2 being depleted in a controlled ramp-down.

Figure 16:
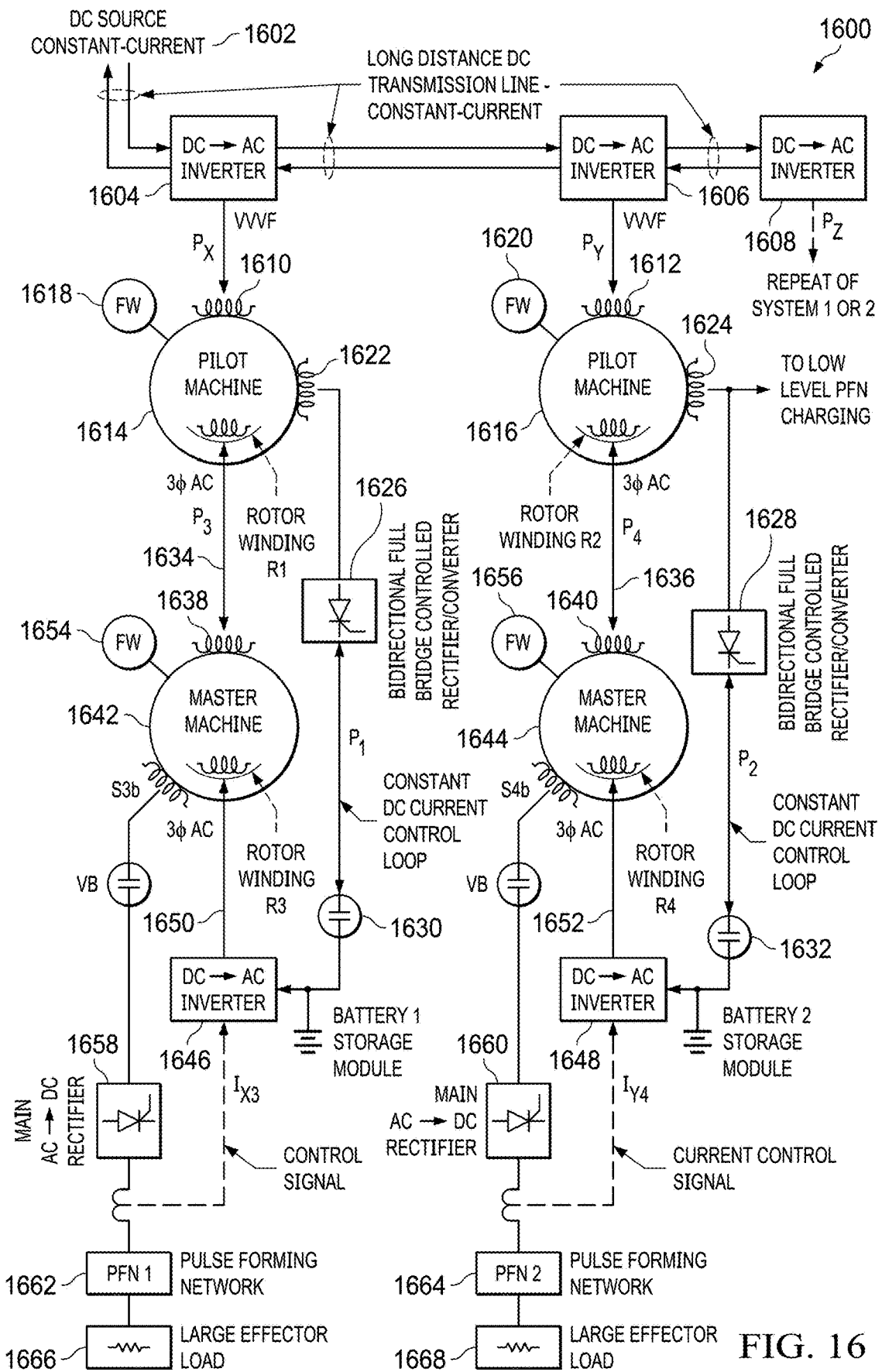
FIG. 16 illustrates an example system implementing a cascade HESM configuration according to this disclosure.

FIG. 16 illustrates an example system 1600 implementing a cascade HESM configuration according to this disclosure. As shown in FIG. 16, the system 1600 includes a cascade arrangement of two master ESMs and two pilot ESMs in a four machine system, which can be extended to any even number of machines. The cascade arrangement allows fast rise times to be attained with stochastic loads and minimizes expensive power conditioning apparatus. The system 1600 uses multiple sets of doubly-fed induction machines with both flywheel and battery energy storage.

The primary supply is a constant-current DC source 1602 with allowance for a long distance DC transmission line hooking multiple pilot machines directly into the main current loop. Main DC to AC converters 1604-1606 provide VVVF power (designated as powers Px, Py) to the stator windings 1610-1612 of the pilot machines 1614-1616. Additional DC to AC power converters 1608 can be connected in series with the converters 1604-1606 for additional subsystems.

Each pilot machine 1614-1616 has a small flywheel 1618-1620 and has its stator output winding 1622-1624 rectified by a controlled rectifier subsystem 1626-1628. The stator output 1622-1624 then feeds each battery energy storage subsystem through an air-blast DC interrupter or breaker 1630-1632. Each pilot machine 1614-1616 also generates, through its rotor polyphase windings R1 and R2, real powers 1634-1636 sent to the main input stator windings 1638-1640 of master machines 1642-1644.

Excitation of the master machines 1642-1644 is from DC to AC VVVF converters 1646-1648 with real and reactive powers 1650-1652, the source being either battery power or a direct feed from the pilot machine 1614-1616. Each master machine 1642-1644 is directly coupled to a flywheel 1654-1656. The main output of the master machines 1642-1644 are stator windings 1638-1640, which feed main AC to DC controlled rectifiers 1658-1660.

PFNs or energy storage capacitor banks 1662-1664 are directly charged by the rectifiers 1658-1660, which in some embodiments are phase-delay thyristor rectifiers capable of both high voltage and high current operation. The PFNs 1662-1664 (or multiple stages thereafter) feed load circuits 1666-1668, which may be inductive-resistive loads or resistive-inductive-capacitive loads representing stochastic loads such as the EM effectors. As a whole, the system 1600 can accommodate non-linear EM effector loads, for example loads which have both a time-dependent resistive characteristic and a time-dependent inductance characteristic. A railgun is one example of such a non-linear load.

Although FIGS. 1 through 16 illustrate example systems for modulating high power in a submersible energy storage vessel utilizing high voltage DC transmission, various changes may be made to these systems. In particular, the makeup and arrangement of the disclosed systems are for illustration only. Components could be added, omitted, combined, or placed in any other configuration according to particular needs.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," or "system" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
multiple hybrid energy storage modules (HESMs) electrically coupled to each other and configured to accept constant-current direct current (DC) input power from a main power source, each HESM configured to provide constant-current output power via a first output to a first load and sequentially or simultaneously provide constant-voltage output power via a second output to a second load, each HESM comprising a combined rotating electrical machine-inertial storage module and electro-chemical storage module configured to generate second power that augments first power derived from the input power from the main power source, wherein each of the constant-current output power and the constant-voltage output power comprises at least a portion of the first power and the second power, wherein the rotating electrical machine-inertial storage module of each HESM comprises a doubly-fed induction machine (DFIM) having input stator windings configured to accept constant-current alternating current (AC) power and one or more stator outputs, which are configured for both constant-current and constant-voltage operation with high attenuation of load power pulsations, wherein the HESMs comprise master machines;
a DC transmission line coupled to the HESMs and connecting the multiple HESMs in series, the DC transmission line configured to provide the input power from the main power source to each HESM;
multiple pilot machines, each pilot machine arranged in a cascade configuration with a corresponding one of the master machines and configured to provide power to one of the loads; and
multiple DC-to-AC power converters, each power converter coupled in series with a corresponding one of the pilot machines and a corresponding one of the master machines and configured to provide variable-voltage variable-frequency (VVVF) power to stator windings of the corresponding pilot machine, the DC-to-AC power converters configured to buffer pulsed loads from the main power source,
wherein, in each HESM:
the rotating electrical machine-inertial storage module comprises a flywheel, a rotor, and a control system; and
when a speed of the flywheel is falling during power delivery, the control system is configured to increase a frequency fed to the rotor in order to maintain a nearly constant frequency at the one or more stator outputs.

2. The system of claim 1, wherein:
each HESM is configured to convert the constant-current DC input power to the constant-current AC power for delivery to one or more of the first and second loads, and
each HESM is further configured to provide bidirectional power flow.

3. The system of claim 1, wherein the main power source is at least one of: a turbine-driven generator, a solar array, a wind generator, an ocean wave kinetic generator, and an ocean thermal-electric generator.

4. The system of claim 1, wherein:
each HESM is a subsea power system; and
the main power source is located onshore.

5. The system of claim 1, wherein, in each HESM, the DFIM has an output winding reactance and the input stator windings have a higher electrical reactance than the output winding reactance.

6. The system of claim 1, wherein:
the first output of each HESM comprises a first stator output winding; and
the second output of each HESM comprises a second stator output winding.

7. The system of claim 6, wherein:
the first stator output winding has a first time constant and is configured to provide the constant-current output power at a first impedance;
the second stator output winding has a second time constant and is configured to provide the constant-voltage output power at a second impedance different than the first impedance; and the first time constant is at least twice the second time constant.

8. The system of claim 1, further comprising:
multiple saturable reactors, each saturable reactor corresponding to one of the HESMs, each saturable reactor configured to help provide current regulation of the corresponding HESM.

9. The system of claim 1, wherein a length of the DC transmission line is at least one thousand meters.

10. A system comprising:
a main power source;
multiple hybrid energy storage modules (HESMs) electrically coupled to each other and configured to accept constant-current electrical input power from the main power source, each HESM configured to provide constant-current output power via a first output to a first load and sequentially or simultaneously provide constant-voltage output power via a second output to a second load, each HESM comprising a combined rotating electrical machine-inertial storage module and electro-chemical storage module configured to generate second power that augments first power derived from the input power from the main power source, wherein each of the constant-current output power and the constant-voltage output power comprises at least a portion of the first power and the second power, wherein the rotating electrical machine-inertial storage module of each HESM comprises a doubly-fed induction machine (DFIM) having input stator windings configured to accept constant-current alternating current (AC) power and one or more stator outputs, which are configured for both constant-current and constant-voltage operation with high attenuation of load power pulsations, wherein the HESMs comprise master machines;
a power transmission line connecting the multiple HESMs in series and configured to provide the input power from the main power source to each HESM;
multiple pilot machines, each pilot machine arranged in a cascade configuration with a corresponding one of the master machines and configured to provide power to one of the loads; and
multiple AC-to-AC power converters, each power converter coupled in series with a corresponding one of the pilot machines and a corresponding one of the master machines and configured to provide variable-voltage variable-frequency (VVVF) power to stator windings of the corresponding pilot machine, the AC-to-AC power converters configured to buffer pulsed loads from the main power source,
wherein, in each HESM:
the rotating electrical machine-inertial storage module comprises a flywheel, a rotor, and a control system; and
when a speed of the flywheel is falling during power delivery, the control system is configured to increase a frequency fed to the rotor in order to maintain a nearly constant frequency at the one or more stator outputs.

11. The system of claim 10, wherein the main power source is at least one of: a turbine-driven generator, a solar array, a wind generator, an ocean wave kinetic generator, and an ocean thermal-electric generator.

12. The system of claim 10, wherein:
each HESM is a subsea power system; and
the main power source is located onshore.

13. The system of claim 10, further comprising:
multiple saturable reactors, each saturable reactor corresponding to one of the HESMs, each saturable reactor configured to help provide current regulation of the corresponding HESM.

14. The system of claim 10, wherein, in each HESM, the DFIM has an output winding reactance and the input stator windings have a higher electrical reactance than the output winding reactance.

15. The system of claim 10, wherein:
the input power comprises direct current (DC) input power; and
the power transmission line comprises a DC transmission line coupled to the HESMs.

16. The system of claim 15, wherein each HESM is configured to convert the DC input power to the constant-current AC power for delivery to one or more of the first and second loads.

17. The system of claim 10, wherein each HESM is further configured to provide bidirectional power flow.

18. The system of claim 10, wherein:
the first output of each HESM comprises a first stator output winding; and
the second output of each HESM comprises a second stator output winding.

19. The system of claim 18, wherein:
the first stator output winding has a first time constant and is configured to provide the constant-current output power at a first impedance;
the second stator output winding has a second time constant and is configured to provide the constant-voltage output power at a second impedance different than the first impedance; and
the first time constant is at least twice the second time constant.

20. The system of claim 10, wherein a length of the power transmission line is at least one thousand meters.

* * * * *